US008719711B2

(12) United States Patent
Katsumata et al.

(10) Patent No.: US 8,719,711 B2
(45) Date of Patent: May 6, 2014

(54) IMAGE FORMING APPARATUS, DISPLAY SCREEN CUSTOMIZING METHOD AND COMPUTER-READABLE STORAGE MEDIUM

(75) Inventors: Motoyuki Katsumata, Kanagawa (JP); Akira Miyazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1212 days.

(21) Appl. No.: 12/196,323

(22) Filed: Aug. 22, 2008

(65) Prior Publication Data

US 2009/0064002 A1 Mar. 5, 2009

(30) Foreign Application Priority Data

Aug. 28, 2007 (JP) ................................ 2007-221412
May 27, 2008 (JP) ................................ 2008-138333

(51) Int. Cl.
*G06F 3/00* (2006.01)

(52) U.S. Cl.
USPC ............ 715/744; 715/762; 715/745; 715/747

(58) Field of Classification Search
USPC ................................. 715/762, 744, 745, 747
See application file for complete search history.

(56) References Cited

U.S. PATENT DOCUMENTS

| | | | | |
|---|---|---|---|---|
| 7,978,618 | B2 * | 7/2011 | Richardson et al. | 370/252 |
| 2005/0120313 | A1 * | 6/2005 | Rudd et al. | 715/866 |
| 2006/0101343 | A1 | 5/2006 | Machida | |
| 2006/0253786 | A1 * | 11/2006 | Hilbert et al. | 715/742 |

FOREIGN PATENT DOCUMENTS

| | | |
|---|---|---|
| JP | 07-064748 | 3/1995 |
| JP | 2003-150971 | 5/2003 |
| JP | 2003-256216 | 9/2003 |
| JP | 2004-021576 | 1/2004 |
| JP | 2005-045370 | 2/2005 |
| JP | 2006-133520 | 5/2006 |
| JP | 2006-231627 | 9/2006 |
| JP | 2008-066887 | 3/2008 |

OTHER PUBLICATIONS

Japanese Office Action dated Mar. 27, 2012.
Japanese Office Action dated Jan. 10, 2012.

* cited by examiner

*Primary Examiner* — Weilun Lo
*Assistant Examiner* — Rashedul Hassan
(74) *Attorney, Agent, or Firm* — IPUSA, PLLC

(57) ABSTRACT

An image forming apparatus includes a plurality of programs to be utilized via corresponding display screens, a screen structure information managing part to manage screen structure information of the display screens, and a customizing information managing part to manage customizing information which records customizing contents with respect to the display screens. The image forming apparatus further includes a screen generating part to generate each display screen corresponding to the plurality of programs, based on the screen structure information and the customizing information related to each display screen.

15 Claims, 32 Drawing Sheets

FIG.6

6-100

SCREEN DEFINITION INFO

| | SCREEN ID | STARTING POINT X | STARTING POINT Y | WIDTH | HEIGHT | SHAPE | LAYOUT |
|---|---|---|---|---|---|---|---|
| 6-1 | WID_COPY_TOP | 0 | 0 | 800 | 444 | aaa.bmp | layout_copy_top |
| 6-2 | WID_COPY_DECK | 56 | 92 | 698 | 344 | bbb.bmp | layout_copy_deck |
| 6-3 | ... | ... | ... | ... | ... | ... | ... |

6-101

SCREEN LAYOUT INFO (layout_copy_top)

ICON INFO

| | SCREEN CONSTITUENT ELEMENT ID | STARTING POINT X | STARTING POINT Y | WIDTH | HEIGHT | IMAGE |
|---|---|---|---|---|---|---|
| 6-4 | CID_COLOR_ICON | 0 | 0 | 120 | 74 | ccc.bmp |
| 6-5 | CID_STATUS_ICON | 156 | 16 | 26 | 26 | ddd.bmp |
| 6-6 | ... | ... | ... | ... | ... | ... |

MESSAGE INFO

| | SCREEN CONSTITUENT ELEMENT ID | STARTING POINT X | STARTING POINT Y | WIDTH | HEIGHT | FONT SIZE | FONT COLOR |
|---|---|---|---|---|---|---|---|
| 6-7 | CID_STATUS_MSG | 188 | 16 | 184 | 26 | 24 | 0xffffff |
| 6-8 | ... | ... | ... | ... | ... | ... | ... |

BUTTON INFO

| | SCREEN CONSTITUENT ELEMENT ID | STARTING POINT X | STARTING POINT Y | WIDTH | HEIGHT | SHAPE | LAYOUT | CUSTOMIZING FLAG |
|---|---|---|---|---|---|---|---|---|
| 6-9 | CID_AUTO_COLOR_BTN | 8 | 92 | 172 | 40 | eee.bmp | layout_auto_color | true |
| 6-10 | CID_FULL_COLOR_BTN | 8 | 140 | 172 | 60 | fff.bmp | layout_full_color | true |
| 6-11 | CID_MONO_COLOR_BTN | 8 | 208 | 172 | 60 | ggg.bmp | layout_mono_color | true |
| 6-12 | CID_CAN_READ_BTN | 8 | 320 | 84 | 60 | hhh.bmp | layout_can_read | false |
| 6-13 | CID_CAN_NOT_READ_BTN | 96 | 320 | 84 | 60 | iii.bmp | layout_can_not_read | false |
| 6-14 | CID_COLOR_CHANGE_BTN | 8 | 400 | 170 | 40 | jjj.bmp | layout_color_change | true |
| 6-15 | CID_AUTO_PAPSEL_BTN | 192 | 92 | 180 | 76 | kkk.bmp | layout_auto_papsel | false |
| 6-16 | CID_PAPER_SELECT_BTN | 376 | 92 | 228 | 76 | lll.bmp | layout_paper_select | false |
| 6-17 | CID_FULL_SIZE_BTN | 192 | 188 | 100 | 60 | mmm.bmp | layout_full_size | false |
| 6-18 | CID_AUTO_ZOOM_BTN | 296 | 188 | 168 | 60 | nnn.bmp | layout_auto_zoom | false |
| 6-19 | CID_ZOOM_71 | 468 | 188 | 104 | 60 | ooo.bmp | layout_zoom_71 | false |
| 6-20 | CID_ZOOM_141 | 576 | 188 | 104 | 60 | ppp.bmp | layout_zoom_141 | false |
| 6-21 | CID_1TO2_SIDE_BTN | 200 | 268 | 44 | 80 | qqq.bmp | layout_side_1to1 | true |
| 6-22 | CID_2TO2_SIDE_BTN | 348 | 268 | 44 | 80 | rrr.bmp | layout_side_2to2 | true |
| 6-23 | CID_1TO2_SIDE_2CMB_BTN | 496 | 268 | 44 | 80 | sss.bmp | layout_side_1to2_2cmb | true |
| 6-24 | CID_1TO1_SIDE_2CMB_BTN | 644 | 268 | 44 | 80 | ttt.bmp | layout_side_1to1_2cmb | true |
| 6-25 | CID_SORT_BTN | 200 | 360 | 44 | 80 | uuu.bmp | layout_sort | false |
| 6-26 | CID_STACK_BTN | 348 | 360 | 44 | 80 | vvv.bmp | layout_stack | false |
| 6-27 | CID_STAPLE_LT_BTN | 644 | 360 | 44 | 80 | www.bmp | laycut_staple_lt | false |

6-102

BUTTON LAYOUT INFO (layout_auto_color)

MESSAGE INFO

| | SCREEN CONSTITUENT ELEMENT ID | STARTING POINT X | STARTING POINT Y | WIDTH | HEIGHT | FONT SIZE | FONT COLOR |
|---|---|---|---|---|---|---|---|
| 6-28 | CID_AUTO_COLOR_MSG | 4 | 4 | 184 | 32 | 24 | 0x000000 |

FIG.8

(A)

411

| FUNCTION NAME | SCREEN ID | SCREEN CONSTITUENT ELEMENT ID | DISPLAY STATE |
|---|---|---|---|
| SEND APPLICATION | WID_SEND_TOP | CID_XXX | true |
| SEND APPLICATION | WID_SENT_TOP | CID_XXX | false |
| ... | ... | ... | ... |

REGISTER (B)

411

| FUNCTION NAME | SCREEN ID | SCREEN CONSTITUENT ELEMENT ID | DISPLAY STATE |
|---|---|---|---|
| COPY APPLICATION | WID_COPY_TOP | CID_AUTO_COLOR_BTN | true |
| COPY APPLICATION | WID_COPY_TOP | CID_FULL_COLOR_BTN | true |
| COPY APPLICATION | WID_COPY_TOP | CID_MONO_COLOR_BTN | true |
| COPY APPLICATION | WID_COPY_TOP | CID_COLOR_CHANGE_BTN | true |
| COPY APPLICATION | WID_COPY_TOP | CID_1TO2_SIDE_BTN | true |
| COPY APPLICATION | WID_COPY_TOP | CID_2TO2_SIDE_BTN | true |
| COPY APPLICATION | WID_COPY_TOP | CID_1TO2_SIDE_2CMB_BTN | true |
| COPY APPLICATION | WID_COPY_TOP | CID_1TO1_SIDE_2CMB_BTN | true |
| COPY APPLICATION | WID_COPY_DECK | CID_PAPDECK1_BTN | true |
| COPY APPLICATION | WID_COPY_DECK | CID_PAPDECK2_BTN | true |
| COPY APPLICATION | WID_COPY_DECK | CID_PAPDECK3_BTN | true |
| COPY APPLICATION | WID_COPY_DECK | CID_PAPDECK4_BTN | true |
| SEND APPLICATION | WID_SEND_TOP | CID_XXX | true |
| SEND APPLICATION | WID_SENT_TOP | CID_XXX | false |
| ... | ... | ... | ... |

FIG.13

13-001

RELATING INFO

| USER NAME | ID OF CUSTOMIZING INFO USED |
|---|---|
| TARO RICOH | 1 |
| HANAKO YAMADA | 0 |
| TARO NIHON | 0 |

13-100

UI CUSTOMIZING INFO ID:0

| FUNCTION NAME | SCREEN ID | SCREEN CONSTITUENT ELEMENT ID | DISPLAY STATE |
|---|---|---|---|
| COPY APPLICATION | WID_COPY_TOP | CID_AUTO_COLOR_BTN | false |
| COPY APPLICATION | WID_COPY_TOP | CID_FULL_COLOR_BTN | false |
| COPY APPLICATION | WID_COPY_TOP | CID_MONO_COLOR_BTN | true |
| COPY APPLICATION | WID_COPY_TOP | CID_COLOR_CHANGE_BTN | true |
| COPY APPLICATION | WID_COPY_TOP | CID_1TO2_SIDE_BTN | true |
| COPY APPLICATION | WID_COPY_TOP | CID_2TO2_SIDE_BTN | true |
| COPY APPLICATION | WID_COPY_TOP | CID_1TO2_SIDE_2CMB_BTN | true |
| COPY APPLICATION | WID_COPY_TOP | CID_1TO1_SIDE_2CMB_BTN | true |
| COPY APPLICATION | WID_COPY_DECK | CID_PAPDECK1_BTN | true |
| COPY APPLICATION | WID_COPY_DECK | CID_PAPDECK2_BTN | true |
| COPY APPLICATION | WID_COPY_DECK | CID_PAPDECK3_BTN | true |
| COPY APPLICATION | WID_COPY_DECK | CID_PAPDECK4_BTN | true |
| SEND APPLICATION | WID_SEND_TOP | CID_XXX | true |
| SEND APPLICATION<br>... | WID_SENT_TOP<br>... | CID_XXX<br>... | true<br>... |

13-101

UI CUSTOMIZING INFO ID:1

| FUNCTION NAME | SCREEN ID | SCREEN CONSTITUENT ELEMENT ID | DISPLAY STATE |
|---|---|---|---|
| COPY APPLICATION | WID_COPY_TOP | CID_AUTO_COLOR_BTN | true |
| COPY APPLICATION | WID_COPY_TOP | CID_FULL_COLOR_BTN | true |
| COPY APPLICATION | WID_COPY_TOP | CID_MONO_COLOR_BTN | true |
| COPY APPLICATION | WID_COPY_TOP | CID_COLOR_CHANGE_BTN | true |
| COPY APPLICATION | WID_COPY_TOP | CID_1TO2_SIDE_BTN | true |
| COPY APPLICATION | WID_COPY_TOP | CID_2TO2_SIDE_BTN | true |
| COPY APPLICATION | WID_COPY_TOP | CID_1TO2_SIDE_2CMB_BTN | true |
| COPY APPLICATION | WID_COPY_TOP | CID_1TO1_SIDE_2CMB_BTN | true |
| COPY APPLICATION | WID_COPY_DECK | CID_PAPDECK1_BTN | true |
| COPY APPLICATION | WID_COPY_DECK | CID_PAPDECK2_BTN | true |
| COPY APPLICATION | WID_COPY_DECK | CID_PAPDECK3_BTN | true |
| COPY APPLICATION | WID_COPY_DECK | CID_PAPDECK4_BTN | true |
| SEND APPLICATION | WID_SEND_TOP | CID_XXX | true |
| SEND APPLICATION<br>... | WID_SENT_TOP<br>... | CID_XXX<br>... | true<br>... |

FIG.18

```
<function name="scanui">
   <item string ="DOCUMENT SIZE"> papersize</item>
   <item   string ="DOCUMENT SURFACE"> scanrface</item>
   <item string ="RESOLUTION">resolution</item>
</function>
```

FIG.19

```
<function name="scanui">
   <name>READ SETTING</name>
   <item string ="DOCUMENT SIZE"> papersize</item>
   <item   string ="DOCUMENT SURFACE"> scanrface</item>
</function>
```

FIG.20

```
<component name = "copyaplui">
   <subcomponent>scanui</subcomponent>
   <subcomponent>editui</subcomponent>
   <subcomponent>printui</subcomponent>
</component>
```

IMAGE FORMING APPARATUS, DISPLAY SCREEN CUSTOMIZING METHOD AND COMPUTER-READABLE STORAGE MEDIUM

BACKGROUND OF THE INVENTION

1. Field of the Invention

The present invention generally relates to image forming apparatuses, display screen customizing methods and computer-readable storage media, and more particularly to an image forming apparatus having installed therein a plurality of programs that are utilized via a display screen, a display screen customizing method for use in such an image forming apparatus, and a computer-readable storage medium which stores a program for causing a computer to function as such an image forming apparatus or to carry out such a display screen customizing method.

2. Description of the Related Art

Recently, image forming apparatuses, such as copying apparatuses, scanners, facsimile apparatuses and printers, have multiple functions in order to cope with the wide variety of usages. Because the image forming apparatus has multiple functions, an operation mode that is set from an operation panel needs to be selected from a large number of modes. Hence, the setting operation, that is required to obtain a desired output, has a tendency of becoming more and more complicated. However, some users may not necessarily use all of the multiple functions, and may only use some of the multiple functions. Nonetheless, the multiple functions are provided, and the costs of development, parts and production of the image forming apparatus are increasing. The expensive image forming apparatus is in convenient for the users, and particularly for the users who use only some of the multiple functions. Accordingly, for those users who use only some of the multiple functions, it would improve the operation ease if only the input means for the operation modes related to some of the multiple functions actually used by the users are displayed in a user-friendly manner which is easy to understand.

However, a user interface that is user-friendly differs depending on the skill level of the user who uses the image forming apparatus. The user who only sometimes uses the image forming apparatus may easily make an operation error if the user interface is complex, and it may take time for the user to operate the complex user interface. For this reason, the user who only sometimes uses the image forming apparatus would prefer to operate a simple user interface which concentrates on only the functions that will most likely be used by the user.

On the other hand, the user who is skilled and frequently uses the image forming apparatus can easily operate a user interface which may be slightly complex. The skilled user requires a complex user interface in order to set all of the multiple functions.

In order to cope with such demands, various techniques have been proposed. For example, a Japanese Laid-Open Patent Application No. 2005-45370 proposes a technique which customizes an arrangement of elements such as buttons on a screen or customizes a switching of displaying and non-displaying states of the elements. A Japanese Laid-Open Application No. 2003-150971 proposes a technique which switches displaying contents for each user who is identified by authentication.

On the other hand, Japanese Laid-Open Patent Applications No. 2003-256216 and No. 2004-21576 propose image forming apparatuses which are capable of updating firmware, by installing or uninstalling functions, and additionally installing or uninstalling extensions with respect to the functions.

However, if the installing or uninstalling is enabled for each function, it is necessary to provide an operation screen for each function. Conventionally, in order to enable customizing of the operation screen that is provided for each function, a customizing logic of the operation screen is provided for each function. In this case, unless the customizing logic is provided according to strict guidelines, the operation screen customizing method would lack unity, and it would be difficult to provide a user-friendly customizing means.

In addition, even though there are a large number of common portions among the customizing logics, the customizing logic is provided separately for each function, and the customizing efficiency is extremely poor.

SUMMARY OF THE INVENTION

Accordingly, it is a general object of the present invention to provide a novel and useful image forming apparatus, display screen customizing method and computer-readable storage medium, in which the problems described above are suppressed.

Another and more specific object of the present invention is to provide an image forming apparatus, a display screen customizing method and a computer-readable storage medium, which can efficiently customize a display screen for each program.

Still another object of the present invention is to provide an image forming apparatus comprising a plurality of programs configured to be utilized via corresponding display screens; a screen structure information managing part configured to manage screen structure information of the display screens; a customizing information managing part configured to manage customizing information which records customizing contents with respect to the display screens; and a screen generating part configured to generate each display screen corresponding to the plurality of programs, based on the screen structure information and the customizing information related to each display screen. According to the image forming apparatus of the present invention, it is possible to efficiently customize the display screen for each program.

A further object of the present invention is to provide a display screen customizing method to be implemented in an image forming apparatus which has a plurality of programs configured to be utilized via corresponding display screens, comprising a screen structure information managing procedure managing screen structure information of the display screens; a customizing information managing procedure managing customizing information which records customizing contents with respect to the display screens; and a screen generating procedure generating each display screen corresponding to the plurality of programs, based on the screen structure information and the customizing information related to each display screen. According to the display screen customizing method of the present invention, it is possible to efficiently customize the display screen for each program.

Another object of the present invention is to provide a computer-readable storage medium which stores a screen customizing program for causing a computer to customize a screen of an image forming apparatus which has a plurality of programs configured to be utilized via corresponding display screens, the screen customizing program comprising a screen structure information managing procedure causing the computer to manage screen structure information of the display screens; a customizing information managing procedure causing the computer to manage customizing information which records customizing contents with respect to the display screens; and a screen generating procedure causing the computer to generate each display screen corresponding to the plurality of programs, based on the screen structure information and the customizing information related to each display screen. According to the computer-readable storage medium of the present invention, it is possible to efficiently customize the display screen for each program.

Other objects and further features of the present invention will be apparent from the following detailed description when read in conjunction with the accompanying drawings.

BRIEF DESCRIPTION OF THE DRAWINGS

FIG. 6 is a diagram showing an example of a structure of a function UI content information of the copy application operation screen;

FIG. 7 is a sequence diagram for explaining a processing sequence at the time of installing a plug-in;

FIG. 8 is a diagram showing an example of a customizing information database registered with UI customizing information of a copy application;

FIG. 13 is a diagram showing an example of a structure of the customizing information database for a case where a structure of an operation screen is modifiable depending on a user;

FIG. 18 is a diagram showing an example of displayable information of a read UI;

FIG. 19 is a diagram showing an example of display target information of the read UI;

FIG. 20 is a diagram showing an example of utilizing information of a copy application UI;

DESCRIPTION OF THE PREFERRED EMBODIMENTS

Figure 1:
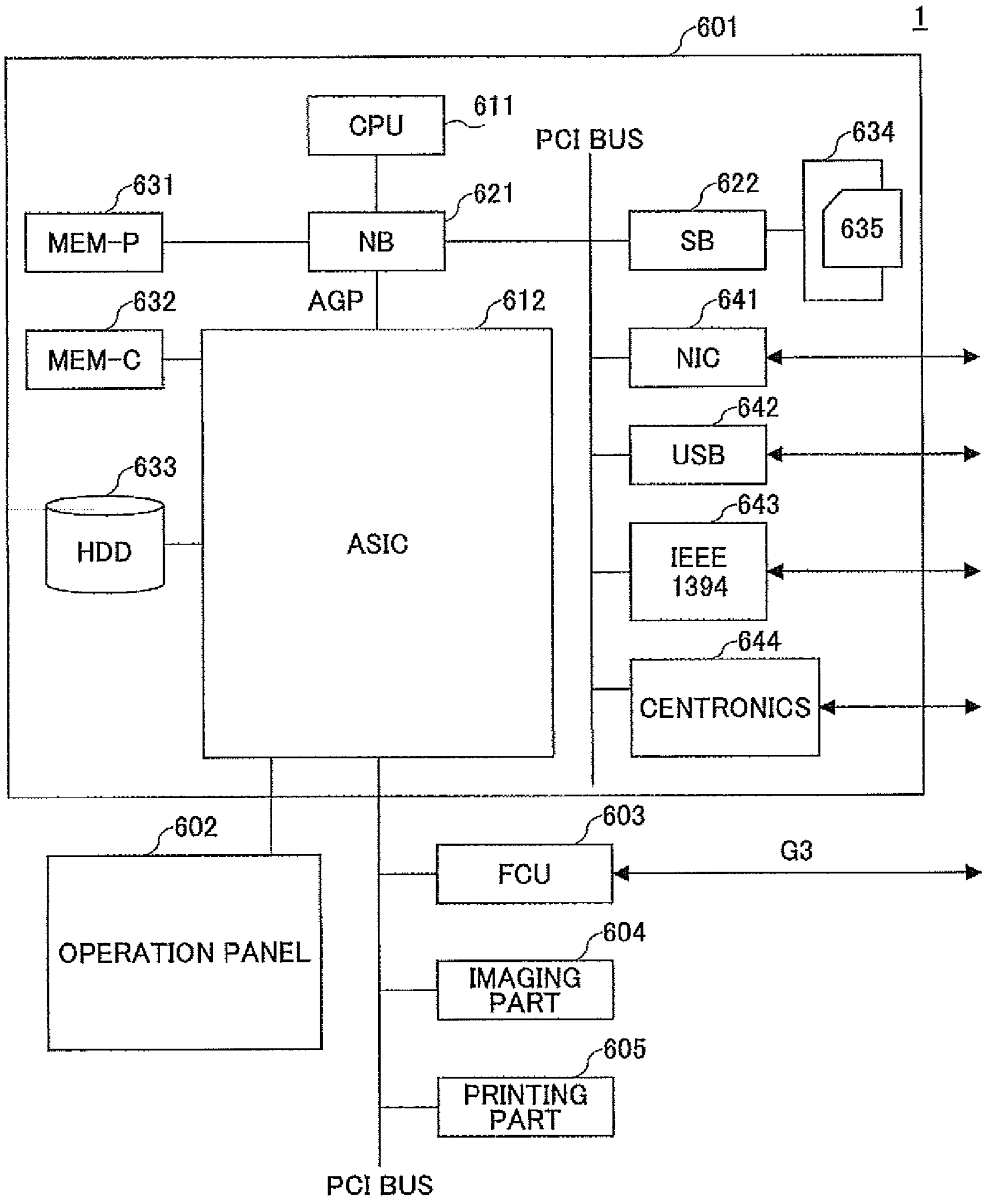
FIG. 1 is a block diagram showing an example of a hardware structure of an image forming apparatus in a first embodiment of the present invention.

A description will be given of embodiments of the image forming apparatus, the display screen customizing method and the computer-readable storage medium according to the present invention, by referring to the drawings.

The computer-readable storage medium, which stores a screen customizing program for causing a computer to customize a display screen as described hereunder, may be formed by any suitable recording medium, including magnetic, optical and magneto-optical recording media, semiconductor memory devices and the like.

First Embodiment

FIG. 1 is a block diagram showing an example of a hardware structure of an image forming apparatus in a first embodiment of the present invention. In this embodiment, the image forming apparatus is described as an example of an information processing apparatus in accordance with the present invention. As a specific example of the image forming apparatus, FIG. 1 shows the hardware structure of a Multi-Function Peripheral (MFP) 1 which has a plurality of functions, such as functions of a printer, a copying apparatus, a scanner and a facsimile apparatus, provided within a single housing. The MFP 1 is sometimes also referred to as a composite apparatus.

The hardware of the MFP 1 includes a controller 601, an operation panel 602, a Facsimile Control Unit (FCU) 603, an imaging part 604, and a printing part 605.

The controller 601 includes a Central Processing Unit (CPU) 611, an Application Specific Integrated Circuit (ASIC) 612, a North Bridge (NB) 621, a South Bridge (SB) 622, a memory (MEM-P) 631, a memory (MEM-C) 632, a Hard Disk Drive (HDD) 633, a memory card slot 634, a Network Interface Controller (NIC) 641, a Universal Serial Bus (USB) device 642, an IEEE1394 device 643, and a Centronics device 644.

The CPU 611 is an IC for carrying out various information processing. The ASIC 612 is an IC for carrying out various image processing. The NB 621 forms a north bridge of the controller 601. The SB 622 forms a south bridge of the controller 601. The memory (MEM-P) 631 is a system memory of the MFP 1. The memory (MEM-C) 632 is a local memory of the MFP 1. The HDD 633 is a storage of the MFP 1. The memory card slot 634 is a slot in which a memory card 235 is set. The NIC 641 is a controller for carrying out a network communication using a Media Access Control (MAC) address. The USB device 642 is a device for providing connection terminals in conformance with the USB standards. The IEEE1394 device is a device for providing connection terminals in conformance with the IEEE1394 standards. The Centronics device 644 is a device for providing connection terminals in conformance with the Centronics specifications. The operation panel 602 includes a hardware (or operation part) which is used by a user to make an input to the MFP 1, and a hardware (or display part) which is used by the user to obtain an output from the MFP 1.

Figure 2:
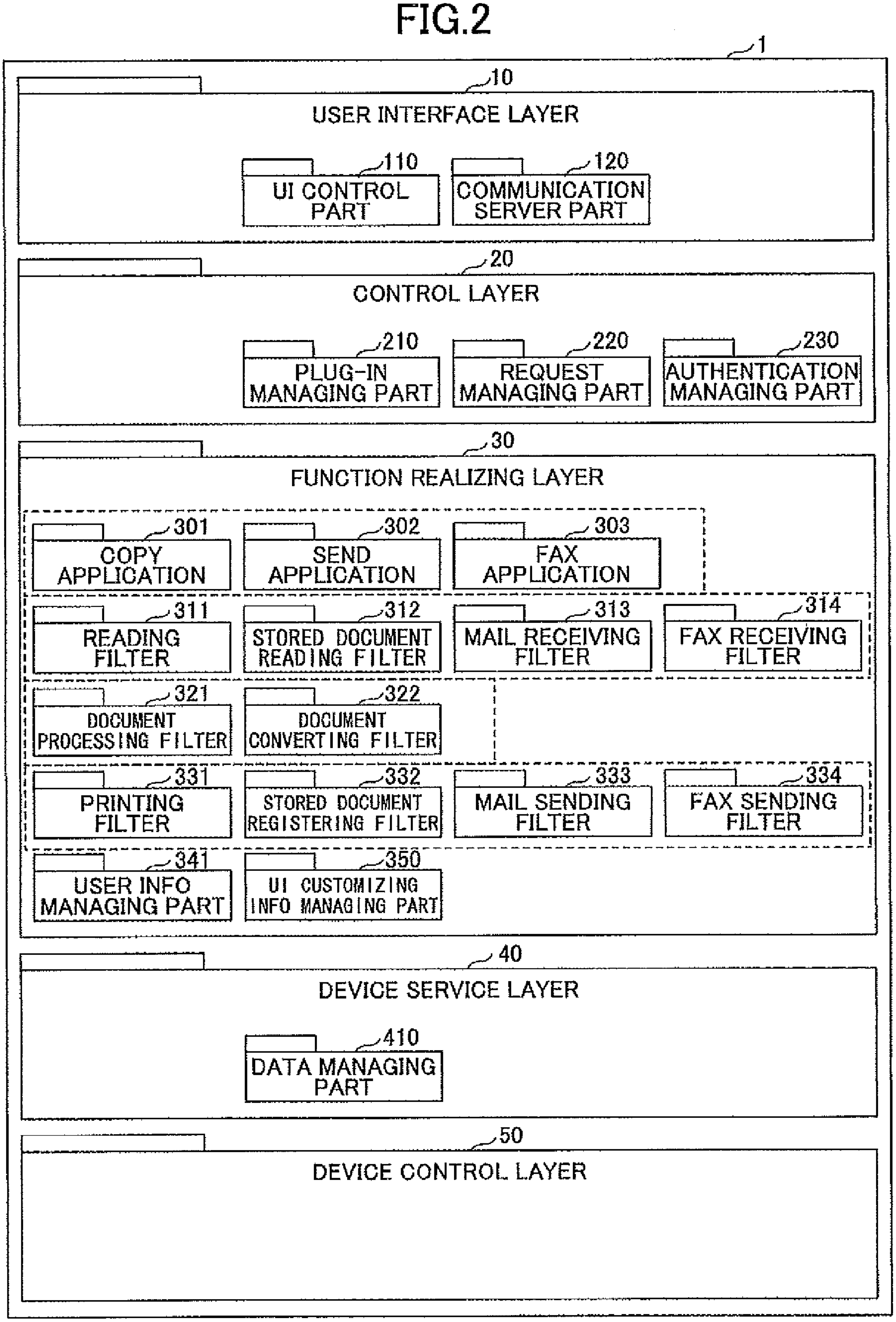
FIG. 2 is a diagram showing a software structure of the image forming apparatus in the first embodiment of the present invention.

FIG. 2 is a diagram showing a software structure of the image forming apparatus in the first embodiment of the present invention. As shown in FIG. 2, the software of the MFP 1 includes a user interface layer 10, a control layer 20, a function realizing layer 30, a device service layer 40, a device control layer 50, and the like. A vertical relationship of the layers in FIG. 2 is based on a calling relationship among the layers. In other words, an upper layer in FIG. 2 basically calls a lower layer.

The user interface layer 10 is implemented with the functions which accept job execution requests such as execution requests for copy, print, scan and facsimile transmission. For example, a User Interface (UI) control part 110, a communication server part 120 and the like are included in the user interface layer 10. For example, the UI control part 110 accepts the job execution request that is input via the operation panel 602. For example, the communication server part 120 accepts the job execution request from a client Personal Computer (PC) or the like via a network which are not shown in FIG. 2. The job execution request that is accepted in the user interface layer 10 is sent to the control layer 20.

The control layer 20 is implemented with the functions which control processes for executing the requested jobs. For example, a plug-in managing part 210, a request managing part 220, an authentication managing part 230 and the like are included in the control layer 20. The plug-in managing part 210 manages a physical address (position information) and a plug-in operation of a "plug-in" that is implemented (or installed) in the MFP 1. In this embodiment, the "plug-in" refers to a program module corresponding to a function which is newly added with respect to the basic functions of the MFP 1 or, a program module corresponding to one of the basic functions of the MFP 1. Each "plug-in" is separately (independently) installable and uninstallable. In other words, the plug-in managing part 210 manages the physical address and the operation of the program corresponding to the basic function of the MFP 1 or the program corresponding to the newly added function of the MFP 1.

The request managing part 220 requests execution of the requested job to each application in the function realizing layer 30. In addition, when a plurality of jobs are executed, the request managing part 220 schedules the execution sequence of the jobs.

In this embodiment, a "job" refers to a unit of service, from the time when the request is input to the time when the final output is obtained, that is provided by the MFP 1 with respect to the user. One job is basically executed by a single application, but one job may be executed by integration of a plurality of applications.

The authentication managing part 230 accepts a user authentication request, and executes an authentication based on information (authentication information) which specifies the user, such as an account name and a password.

The function realizing layer 30 is implemented with a group of software parts (software part group) which respectively execute a part of the job provided by the MFP 1. The software parts are sometimes also referred to as components. It is possible to build an application for executing one job by combining the software parts in the function realizing layer 30. In this embodiment, the software part in the function realizing layer 30 is referred to as a "filter", because the application which executes the job of the MFP 1 employs a software architecture called "pipe and filter".

Figure 3:
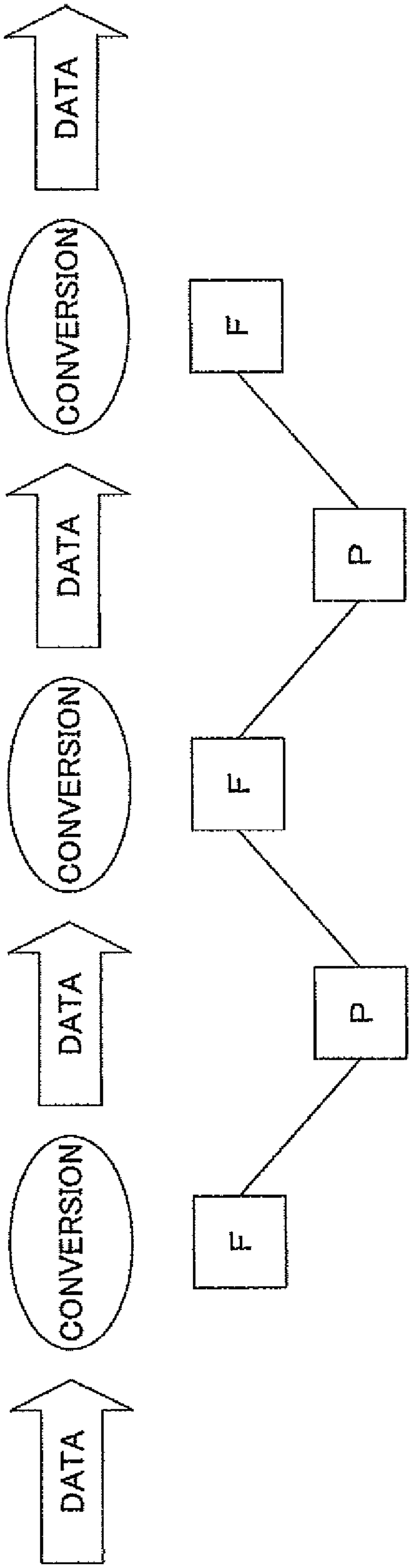
FIG. 3 is a diagram for explaining the concept of a pipe and filter architecture.

FIG. 3 is a diagram for explaining the concept of the pipe and filter architecture. In FIG. 3, "F" denotes a filter, and "P" denotes a pipe. As shown in FIG. 3, the filters are connected via the pipes. Each pipe carries out a conversion with respect to data that is input, and outputs data that is a result of the conversion. The pipe transfers the data output from the filter to the next or adjacent filter.

In other words, in the MFP 1 of this embodiment, the job is treated as a succession of "conversions" with respect to a document (data). The job of the MFP 1 may be generalized as being made up of inputting, processing and outputting of the document. Accordingly, each of the "inputting", "processing", and "outputting" is treated as a "conversion", and the software part which realizes one "conversion" is formed as a filter. The filter which realizes the "inputting" is referred to as an "inputting filter". The filter which realizes the "processing" is referred to as a "processing filter". The filter which realizes the "outputting" is referred to as an "outputting filter". Each of the filters are independent, and basically, no dependency relationship (call relationship) exists among the filters. Accordingly, the adding (installing) or deleting (uninstalling) can be made in units of filters, and the filter is treated as one "plug-in" of this embodiment.

In FIG. 2, the function realizing layer 30 includes, as the inputting filters, a reading filter 311, a stored document reading filter 312, a mail receiving filter 313, a facsimile receiving filter 314 and the like.

The reading filter 311 controls the reading of image data by the scanner, and outputs the read image data. The stored document reading filter 312 reads document data (image data) stored in a storage unit of the MFP 1, and outputs the read document data. The mail receiving filter 313 receives an electronic mail, and outputs data included in the electronic mail that is received. The facsimile receiving filter 314 controls facsimile reception, and outputs print data that is received by the facsimile reception.

The function realizing layer 30 includes, as the processing filters, a document processing filter 321, a document converting filter 322 and the like. The document processing filter 321 subjects input data to a predetermined image conversion process (assemble, enlarge or reduce), and outputs the converted data. The document converting filter 322 converts a data format of the image data. For example, the document converting filter 322 carries out a rendering process, to convert PostScript data that is input into bit-map data and to output the bit-map data.

The function realizing layer 30 includes, as the outputting filter, a printing filter 331, a stored document registering filter 332, a mail sending filter 333, a facsimile sending filter 334 and the like.

The printing filter 331 causes the input data to be output (printed) on the printer (plotter). The stored document registering filter 332 stores the input data in the storage unit of the MFP 1, such as the HDD 633. The mail sending filter 333 sends the electronic mail by attaching thereto the input data. The facsimile sending filter 334 sends the input data by facsimile transmission.

The function realizing layer 30 further includes, as applications which execute the job by managing the sequence in which a plurality of filters are to be connected and executing the filters in this sequence, a copy application 301, a send application 302, a facsimile application 303 and the like. For example, the copy application 301 realizes the copy function (copy application) by a combination of the reading filter 311, the document processing filter 321 and the printing filter 331.

The application in the function realizing layer 30 can also be installed or uninstalled independently, and is treated as one "plug-in" of this embodiment.

The function realizing layer 30 further includes, as a means of realizing persistence of data such as setting information with respect to the application or filter, and referring, updating, deleting and retrieving of the persistent data, a user information managing part 341 and a UI customizing information managing part 350.

The user information managing part 341 registers (makes persistent), in a data managing part 410 which will be described later, authentication information, such as a user name and a password of the user for making a log-in to the MFP 1, and performs the referring, updating, deleting and retrieving. The UI customizing information managing part 350 registers (makes persistent), in the data managing part 410, data of a customizing target part with respect to screen structure information, and performs the referring, updating, deleting and retrieving. The screen structure information is the information for generating an operation screen (display screen) to be displayed on the operation panel or, the information representing a structure of the operation screen. The data of the customizing target part may be difference information caused by the customizing.

The device service layer 40 is implemented with the lower functions which are used in common by each filter in the function realizing layer 30. The device service layer 40 includes the data managing part 410 which represents various databases which will be described later.

The device control layer 50 is implemented with the function or means for controlling the device of the MFP 1.

Figure 4:
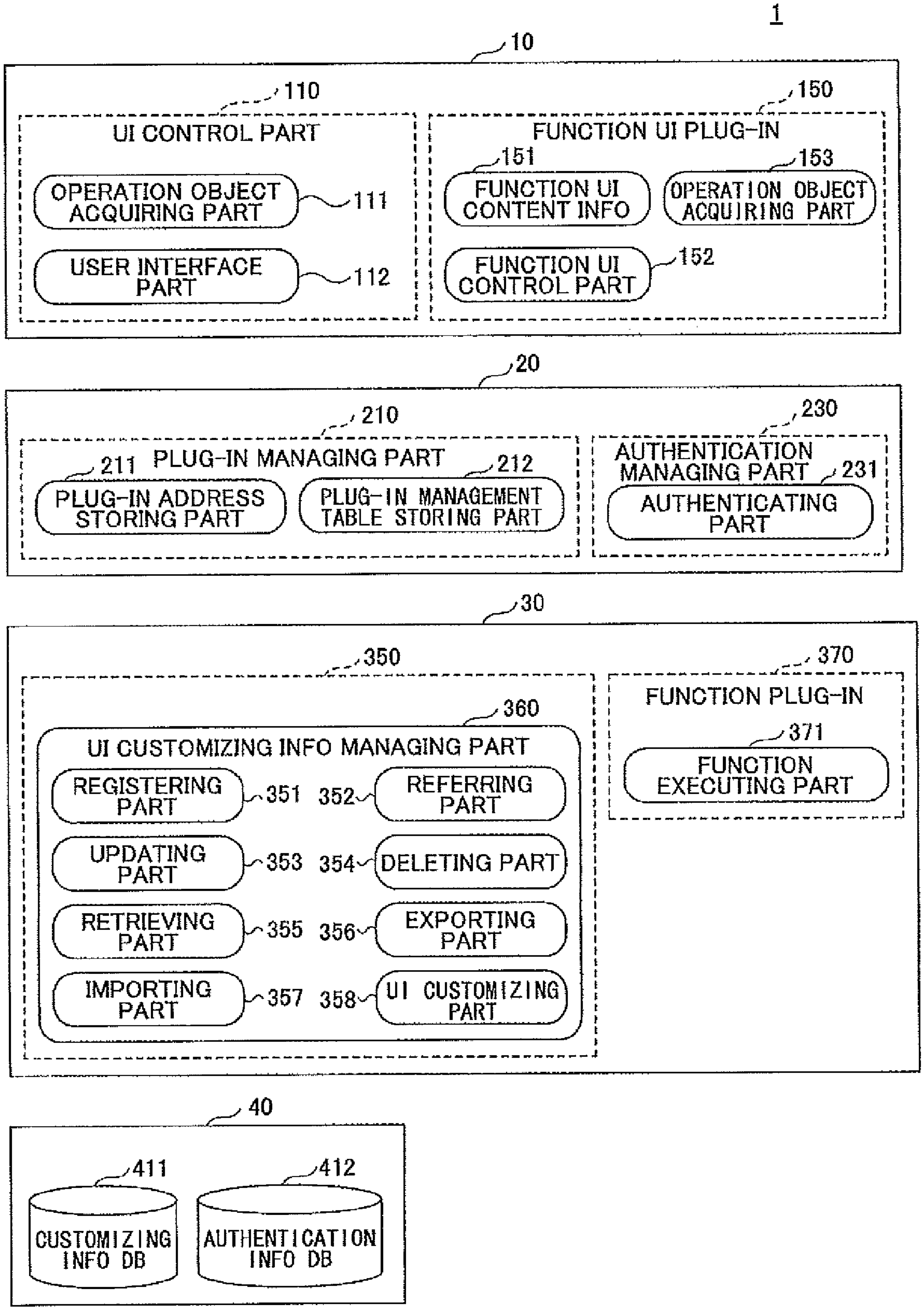
FIG. 4 is a diagram showing an example of a software structure for realizing an operation screen customizing function.

Next, a more detailed description will be given of structural elements related to customizing the operation screen, in the software structure shown in FIG. 2. FIG. 4 is a diagram showing an example of a software structure for realizing an operation screen customizing function. In FIG. 4, those parts which are the same as those corresponding parts in FIG. 2 are designated by the same reference numerals.

In the user interface layer 10, the UI control part 110 includes an operation object acquiring part 111 and a user interface part 112. The user interface part 112 controls generation and display of an operation screen on the operation panel 602 and the like, and controls processes depending on instructions input from the operation panel 602 and the like. The operation object acquiring part 111 acquires an operation object of the plug-in that is operating (or running) in the MFP 1. The operation object refers the so-called object (instance of class) which is formed in a memory in order to access the plug-in that is operating.

The user interface layer 10 shown in FIG. 4 further includes a function UI plug-in 150. The function UI plug-in 150 realizes an operation screen (user interface) of a function plug-in 370 of the function realizing layer 30. The function plug-in 370 will be described later. A pair formed by the function UI plug-in 150 and the function plug-in 370 corresponds to one filter or application shown in FIG. 2. In other words, each filter or application includes a corresponding pair of function UI plug-in 150 and function plug-in 370. Accordingly, pairs of the function UI plug-in 150 and the function plug-in 370 exist depending on the number of filters or applications installed in the MFP 1. Because the function UI plug-in 150 has a strong relation to the operation screen (user interface), the function UI plug-in 150 is shown in the user interface layer 10.

The function UI plug-in 150 includes function UI content information 151, a function UI control part 152, and an operation object acquiring part 153. The function UI content information 151 is the screen structure information that is used by the function UI plug-in 150 to generate the operation screen of the function plug-in 370 (or to represent the structure (layout) of the operation screen). The function UI control part 152 controls the operation screen that is displayed based on the function UI content information 151. For example, the function UI control part 152 detects an input made by the user via the operation screen, calls the function plug-in 370 depending on the input, and updates the display content of the operation screen depending on a state change notification from the function plug-in 370 or the like. The operation object acquiring part 153 acquires the operation object of another plug-in that is operating in the MFP 1.

In this embodiment, the operation screen that is realized by the function UI plug-in 150 is displayed on a local user interface such as the operation panel 602 provided on the MFP 1. However, the operation screen may be displayed on a client PC or the like which is connected to the MFP 1 via a network using the communication server part 120.

In the control layer 20 shown in FIG. 4, the plug-in managing part 210 includes a plug-in address storing part 211 and a plug-in management table storing part 212. The plug-in address storing part 211 stores and manages address information of a file storing an executing program of each plug-in installed (added) with respect to the MFP 1. More particularly, the plug-in address storing part 211 stores a name of the plug-in and an address where the plug-in is stored, in correspondence with each other. The plug-in management table storing part 212 manages the operation object of each plug-in. In other words, the operation object of the plug-in that is started is registered in the plug-in management table storing part 212.

Each plug-in uses the functions of other plug-ins or, refers to the information of the other plug-ins. Hence, each plug-in has an operation object acquiring part for acquiring the operation object stored in the plug-in management table storing part 212. In FIG. 4, the operation object acquiring part 111 or 152 is illustrated only with respect to the UI control part 110 and the function UI plug-in 150. However, the other plug-ins similarly include the operation object acquiring part. Therefore, each plug-in can make a function execution request with respect to the other plug-ins via the plug-in management table storing part 212. For example, in order for the function UI plug-in 150 to make access (for example inquire the state of the function) to the corresponding function plug-in 370, the function UI plug-in 150 simply needs to acquire the operation object of the function plug-in 370.

In FIG. 4, the authentication managing part 230 includes an authenticating part 231. The authenticating part 231 is input via a screen for inputting the authentication information. By comparing the information (for example, the user name) for specifying the user and the information (for example, the password) for authenticating the user with registered contents of an authentication information database (DB) 412 in the device service layer 40, it is possible to authenticate the user. The authentication information DB 412 registers the information (for example, the user name) for specifying the user who can use the equipment, and information (for example, the password) for authenticating the user. The information for authenticating the user is not limited to the password, and biometrical information (for example, fingerprint information) may be used for the user authentication.

In the function realizing layer 30 shown in FIG. 4, the function plug-in 370 includes a function executing part 371 for carrying out a process to execute the function. The function plug-in 370 may have an operation screen corresponding to the function, but FIG. 4 shows an example where the operation screen is implemented in another plug-in (function UI plug-in 150).

The UI customizing information managing part 350 is a plug-in for managing UI customizing information. The UI customizing information records customizing contents with respect to the operation screen of the function UI plug-in 150. The UI customizing information is stored in a customizing information database (DB) 411 in the device service layer 40.

The UI customizing information managing part 350 includes a registering part 351, a referring part 352, an updating part 353, a deleting part 354, a retrieving part 355, an exporting part 356, an importing part 357 and a UI customizing part 358.

The registering part 351 registers the UI customizing information in the customizing information DB 411. The referring part 352 causes a reference to be made to the specified UI customizing information. The updating part 353 updates the existing UI customizing information. The deleting part 354 deletes the specified UI customizing information from the customizing information DB 411. The retrieving part 355 retrieves the UI customizing information from the customizing information DB 411. The exporting part 356 converts the UI customizing information within the customizing information DB 411 into the Comma Separated Value (CSV) format or the extensible Markup Language (XML) format, and writes the converted UI customizing information in the CSV or XML format, as a file, into an external storage unit (recording medium). The importing part 357 converts the UI customizing information which has been written in the external storage unit by the exporting into storage format of the customizing information DB 411, and writes back the UI customizing information in the customizing information DB 411.

The UI customizing part 358 controls the processes of editing the UI customizing information or making a new registration by duplicating the UI customizing information. More particularly, the UI customizing part 358 uses the referring part 352 to make a reference to the UI customizing information which is the editing target, customizes (edits) the UI customizing information, and uses the updating part 353 to reflect the customized result (edited result) to the customizing information DB 411.

In this embodiment, the UI customizing part 358 is arranged within the UI customizing information managing part 350, however, the UI customizing part 358 may be implemented as an independent plug-in. In addition, the UI customizing part 358 may be included in a dedicated application of the PC or the like.

In FIG. 4, the customizing information DR 411 and the authentication information DB 412 are constituent elements of the data managing part 410.

Figure 5:
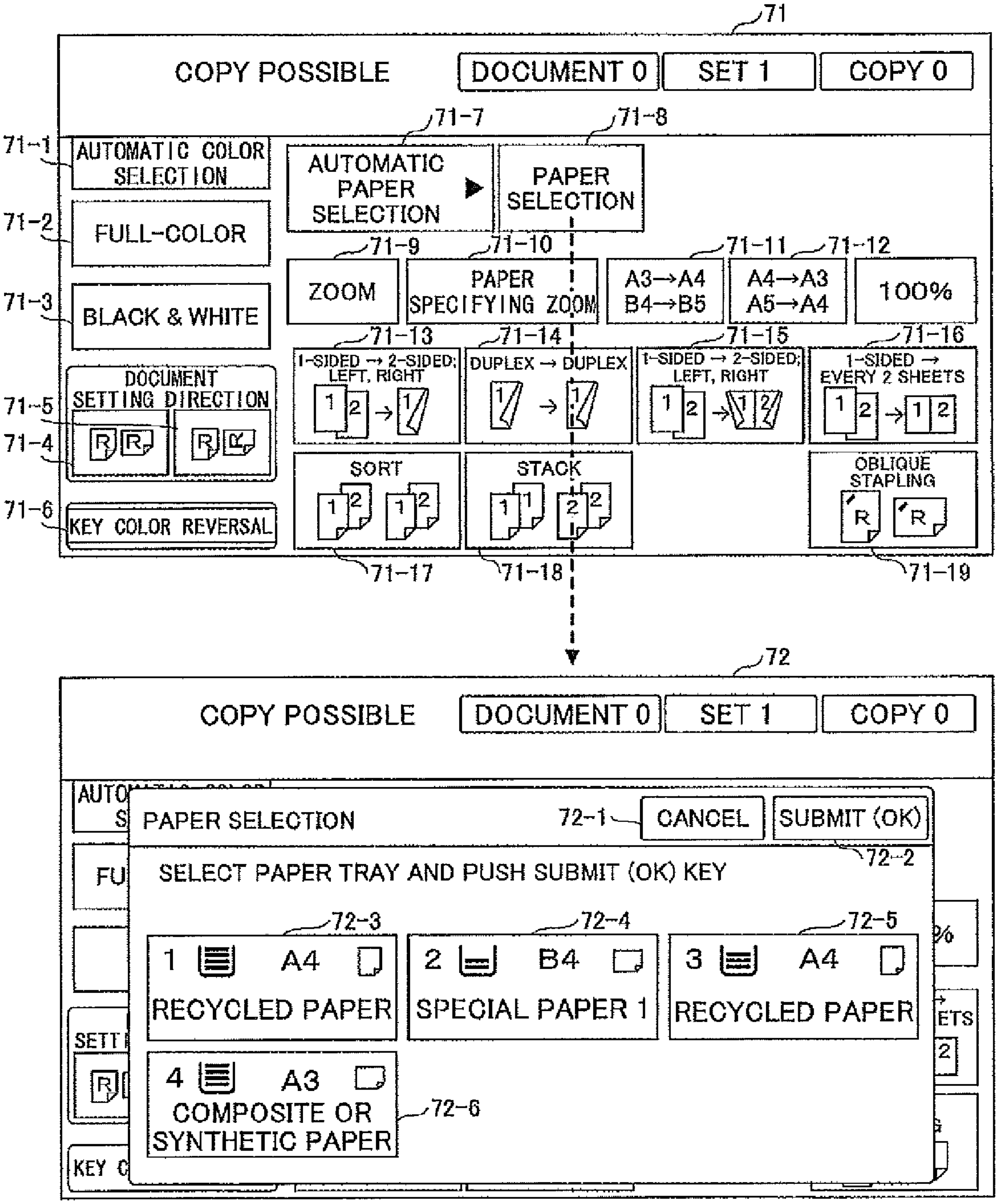
FIG. 5 is a diagram showing an example of a copy application operation screen.

In this embodiment, the operation screen of the copy application 301 will be described as being the customizing target. FIG. 5 is a diagram showing an example of the copy application operation screen. In other words, the operation screen shown in FIG. 5 is displayed based on the function UI content information 151 that is included in the function UI plug-in 150 of the copy application 301.

In FIG. 5, a top screen 71 is the operation screen which is first displayed when the operation target is switched to the copy application 301. The top screen 71 includes 19 buttons 71-1 through 71-19. The buttons 71-1 through 71-3 are for setting color modes, the button 71-6 is for inverting a key color, and the buttons 71-13 through 71-16 are for setting the document surface, the printing surface or the assembling. In this embodiment, it is assumed for the sake of convenience that of the 19 buttons 71-1 through 71-19, these buttons 71-1 through 71-3, 71-6 and 71-13 through 71-16 can be customized and the displaying and non-displaying states of these buttons 71-1 through 71-3, 71-6 and 71-13 through 71-16 can be switched.

A paper selection screen 72 is displayed when the button 71-8 is selected on the top screen 71. The paper selection screen 72 includes 6 buttons 72-1 through 72-6. In this embodiment, it is assumed for the sake of convenience that of the 6 buttons 72-1 through 72-6, the buttons 72-3 through 72-6, which are for selecting paper supply trays, can be customized and the displaying non-displaying states of these buttons 72-3 through 72-6 can be switched.

A description will be given of the function UI content information 151 (screen structure information) corresponding to the top screen 71 an the paper selection screen 72 shown in FIG. 5. FIG. 6 is a diagram showing an example of the structure of the function UI content information of the copy application operation screen.

In FIG. 6, function UI content information 151*a* of the copy application 301 includes screen definition information 6-100 defining information of all operation screens of the copy application 301, screen layout information 6-101 defining layouts of screen structure elements (display parts) such as buttons and icons arranged on the operation screen, and button layout information 6-102 defining the screen structure elements such as messages and icons arranged with each button. The screen layout information 6-101 exists for each screen. The button layout information 6-102 exists for each button in which the message or icon is arranged.

The screen definition information 6-100 includes information such as a screen identification (ID), a starting point X, a starting point Y, a width, a height, a shape and a layout, for each operation screen. The screen ID is used to identify the operation screen, which is the operation target, by the function UI control part 152 of the function UI plug-in 150 of the copy application 301. The starting points X and Y are coordinate values prescribing the layout position of the operation screen when the top left of a touch panel of the operation panel 602 is regarded as the origin. The width and the height are information respectively indicating the width and the height of the operation screen. The shape is a file name of an image which is displayed as a background of the operation screen. FIG. 6 shows an example where the bit-map image is used. The layout is an identification name of the screen layout information 6-101 in which the layout of the operation screen is defined. In other words, the operation screen and the screen layout information 6-101 thereof are related by the value of the layout.

For example, in the screen definition information 6-100, a row 6-1 shows data related to the top screen 71 shown in FIG. 5, and a row 6-2 shows data related to the paper selection screen 72 shown in FIG. 5.

Next, a description will be given of the screen layout information 6-101. The screen layout information 6-101 shown in FIG. 6 is identified by the screen layout information of the top screen 71, that is, the identification name "layout_copy_top" which is specified as the layout value in the row 6-1.

In the screen layout information 6-101, rows 6-4 though 6-6 show definition information (icon information) related to the icon arranged in the corresponding operation screen (top screen 71). The icon information includes information such as a screen constituent element ID, the starting point X, the starting point Y, the width, the height and the image, for each icon.

The screen constituent element ID is used by the function UI control part 152 to identify the icon, similarly to the screen ID which is used to identify the operation screen. Columns of the starting points X and Y are information indicating the arranged position (or layout position) of the icon on the operation screen, and is represented by relative coordinate values using the starting point of the operation screen as the origin, for example. The width and the height indicate the width and the height of the icon. The image is a file name of the image of the icon (icon image). FIG. 6 shows an example where the bit-map image is used.

Rows 6-7 and 6-8 are information (message information) related to messages displayed on the corresponding operation screen (top screen 71). The message information includes the screen constituent element ID, the starting point X, the starting point Y, the width, the height, a font size and a font color, for each message. The information from the image constituent element ID up to the height are defined similarly as in the case of the icon information. The font size is a size of a font of the message. The font color is a color of the font of the message.

Rows 6-9 through 6-27 are definition information (button information) related to the buttons arranged in the corresponding operation screen (top screen 71). The button information includes information such as the screen constituent element ID, the starting point X, the starting point Y, the width, the height, a shape, a layout and a customizing flag, for each button. The information from the image constituent element ID up to the height are defined similarly as in the case of the icon information. The shape is a file name of an image that is used as a shape (background) of the button. The layout is an identification name of the button layout information 6-102 in which the layout (layout or arrangement of the icon, message or the like) within the button is defined. In other words, the button and the button layout information 6-102 thereof are related by the value of the layout. The customizing flag is information indicating whether or not the customizing is possible (whether or not switching of the displaying and non-displaying states is possible). In FIG. 6, the customizing flag indicates that the customizing is possible when the value thereof is "true", and the customizing flag indicates that the customizing is impossible when the value thereof is "false".

Next, a description will be given of the button layout information 6-102. The button layout information 6-102 shown in FIG. 6 is the button layout information of the button 71-1 shown in FIG. 5, that is, the button layout information identified by the identification name "layout_auto_color" which is specified as the layout value in the row 6-9. The structure of the button layout information 6-102 has the same format as the icon information or the message information of the screen layout information 6-101. In the example shown, only the message related to row 6-28 is defined, but this is because only the message is displayed in the button 71-1.

Figure 7:
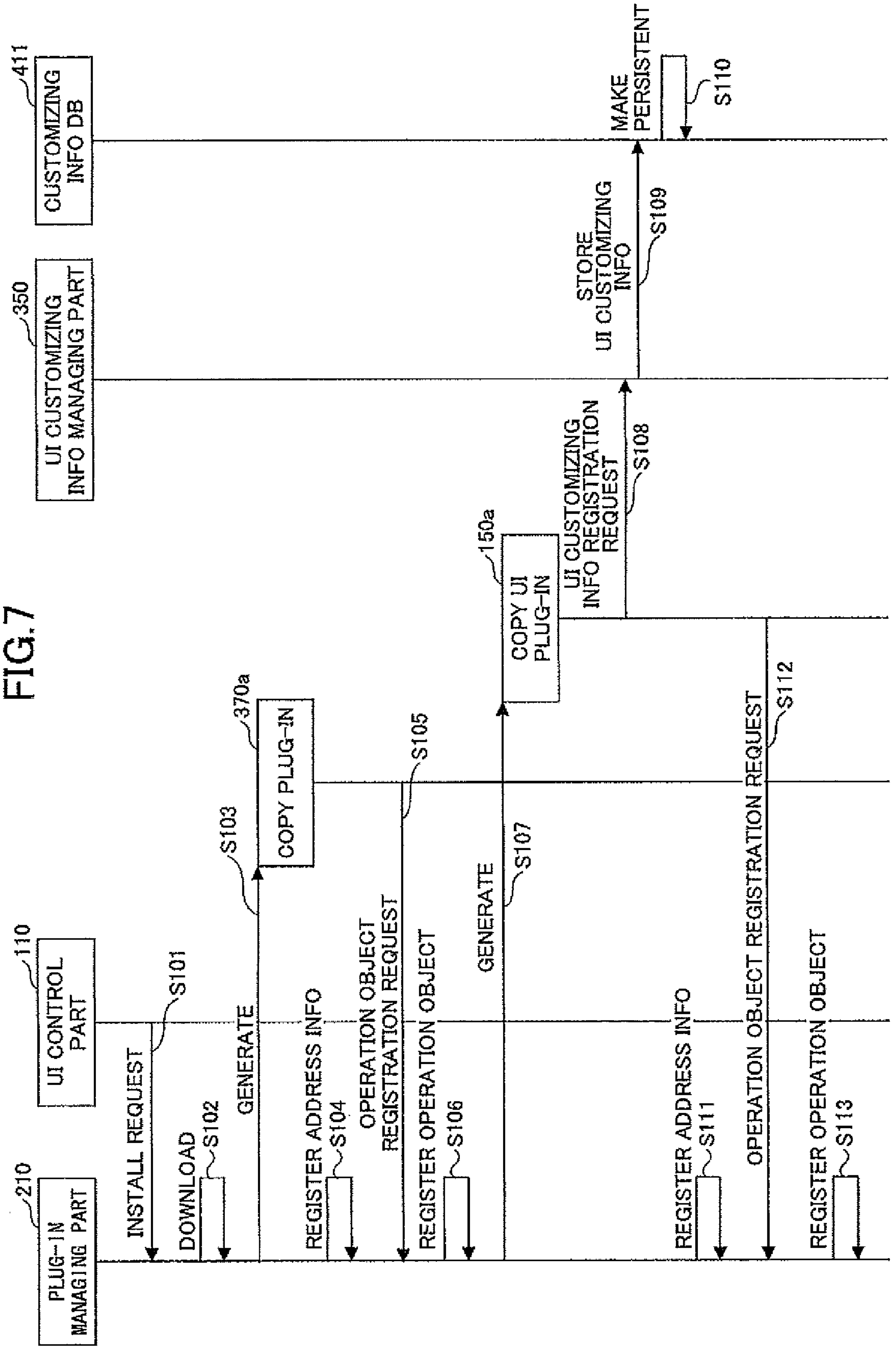

A description will now be given of a processing sequence of the MFP 1. FIG. 7 is a sequence diagram for explaining the processing sequence at the time of installing a plug-in. FIG. 7 shows a case where the plug-in of the copy application 301 is installed.

For example, when the user selects the "copy application 301" on an install screen displayed on the operation panel 602 and pushes the "install" button, the UI control part 110 requests installing of the copy application 301 with respect to the plug-in managing part 210 (step S101). The plug-in managing part 210 acquires the function plug-in 370 (hereinafter referred to as a "copy plug-in 370*a*") corresponding to the copy application 301 which is to be installed, and the function UI plug-in 150 (hereinafter referred to as a "copy UI plug-in 150*a*"), and stores the acquired plug-ins 370*a* and 150*a* at positions to be installed (step S102). The plug-ins 370*a* and 150*a* may be acquired by downloading from a predetermined computer via a network or, from a recording medium (for example, the memory card 235 set in the memory card slot 234) which is connected to the MFP 1.

Next, the plug-in managing part 210 generates the operation object of the copy plug-in 370*a* of the copy application 301 (step S103), and registers the address information of the copy plug-in 370*a* in the plug-in address storing part 211 (step S104).

The copy plug-in 105*a* requests registration of the operation object with respect to the plug-in managing part 210, depending on the generation of the operation object (step S105). The plug-in managing part 210 registers the name and the operation object of the copy plug-in 370*a* in correspondence with each other in the plug-in management table storing part 212 (step S106).

Then, the plug-in managing part 210 generates the operation object of the copy UI plug-in 150*a* of the copy application 301 (step S107). The copy UI plug-in 150*a* uses the function UI content information 151 (hereinafter referred to as a "copy UI content information 151*a*") thereof to extract the screen constituent element information (UI customizing information) which is the customizing target, and requests registration of the extracted UI customizing information with respect to the UI customizing information managing part 350 (step S108). The screen constituent element information which is the customizing target, corresponds to the information in the row where the value of the customizing flag is "true", of the button information in the screen layout information 6-101 shown in FIG. 6.

The customizing information managing part 350 stores the customizing information in the customizing information DB 411 in response to the UI customizing information registration request (step S109). Accordingly, the UI customizing information of the copy application 301 is made persistent in the customizing information DB 411 (step S110). The customizing information is related, that is, stored in a related manner, for each application (plug-in).

On the other hand, the plug-in managing part 210 registers the address information of the copy UI plug-in 150*a* in the plug-in address storing part 211, after generating the operation object of the copy UI plug-in 150*a* (step S111).

Thereafter, the copy plug-in 150*a* requests registration of the operation object with respect to the plug-in managing part 210 (step S112). The plug-in managing part 210 registers the name and the operation object of the copy UI plug-in 150*a* in correspondence with each other in the plug-in management table storing part 212 (step S113).

The UI customizing information of the copy application 301 is registered in the customizing information DB 411 by the installing process described above.

FIG. 8 is a diagram showing an example of the customizing information database registered with UI customizing information of the copy application. In FIG. 8, (A) shows a state of the customizing information DB 411 before the UI customizing information of the copy application 301 is registered. As shown in (A) of FIG. 8, the UI customizing information related to the send application 302 is registered.

As shown in (A) of FIG. 8, the UI customizing information includes information such as a function name, a screen ID, a screen constituent element ID and a display state, for each screen constituent element (button). The function name indicates the function of the plug-in (application) which displays the operation screen including the button that is the customizing target. The screen ID identifies the operation screen including the button that is the customizing target. The screen constituent element ID identifies the button that is the customizing target. The display state is information indicating whether or not to display the screen constituent element (button) when displaying the operation screen. The display state indicates that the screen constituent element (button) is to be displayed when the value thereof is "true", and indicates that the screen constituent element (button) is not to be displayed when the value thereof is "false".

On the other hand, (B) in FIG. 8 shows a state of the customizing information DB 411 after the UI customizing information of the copy application 301 is registered. As shown in (B) of FIG. 8, a record related to the screen constituent element having the customizing flag with the value "true" in FIG. 6 is newly added. The information forming the record that is newly added is output by the copy UI plug-in 150*a* in the step S108 shown in FIG. 7. Because the copy UI plug-in 150*a* itself knows (stores) the function name, the copy UI plug-in 150*a* adds the information of the record with respect to the information extracted by the copy UI content information 151*a*. In addition, the display state may take a default value "true" when the UI customizing information is initially registered or, a value which is predefined for each plug-in may be registered for the display state. Furthermore, although FIG. 8 represents the customizing information DB 411 in the form of a simple table, the customizing information DB 411 may be formed by a plurality of tables that are normalized.

Figure 9:
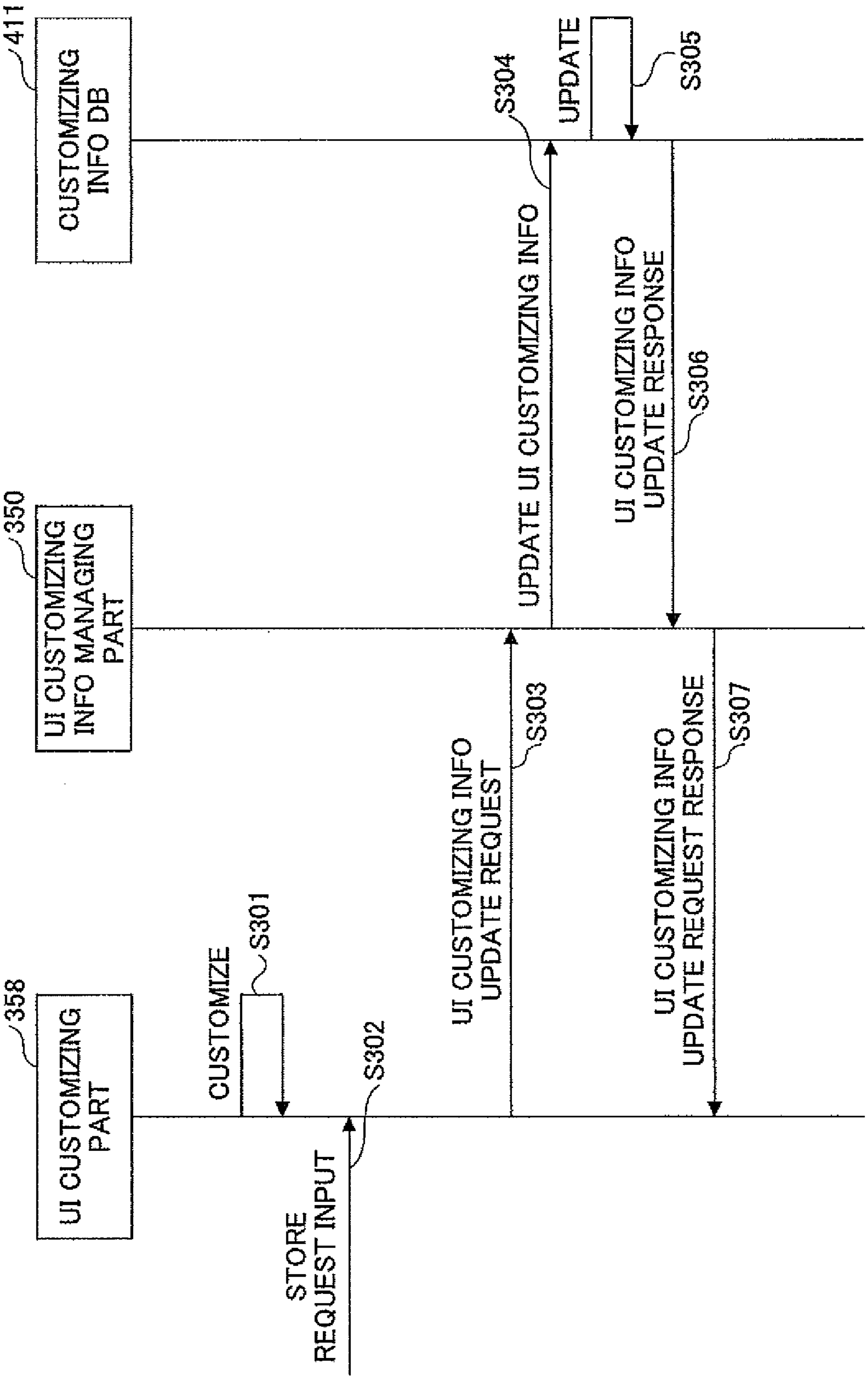
FIG. 9 is a sequence diagram for explaining an operation screen customizing process.

Next, a description will be given of a process of customizing the operation screen of the copy application 301 using the UI customizing information. FIG. 9 is a sequence diagram for explaining an operation screen customizing process. The UI customizing information managing part 350 shown in FIG. 9 corresponds to a part of the UI customizing information managing part 350 excluding the UI customizing part 358. When starting the process shown in FIG. 9, it is assumed for the sake of convenience that the UI customizing part 358 has already acquired the UI customizing information of the copy application 301 from the customizing information DB 411 and has stored (cached) this UI customizing information by a cache process.

The UI customizing part 358 displays a customizing screen on the operation panel 602, for example, and urges the user to customize the operation screen of the copy application 301 on the customizing screen (step S301).

The customizing screen may be a check list which urges the selection (or checking) of the displaying or non-displaying state for each customizable screen constituent element, based on the UI customizing information shown in FIG. 8. Alternatively the customizing screen may display an actual operation screen and urge selection of the buttons which are to be set to the displaying or non-displaying state on the operation screen. In either case, the buttons which are to be set to the displaying or non-displaying state by the customizing are selected by the user, and the UI customizing part 358 edits (updates) the stored (cached) UI customizing information depending on the user's selection. More particularly, the display state of the button that is selected to be the displaying target is set to the value "true", and the display state of the button that is selected to be the non-displaying target is set to the value "false".

Next, a store request to store the customized result is input by the user (step S302). The UI customizing part 358 outputs the edited UI customizing information to the UI customizing information managing part 350 in response to the store request, and makes an update to update the customizing information DB 411 (step S303). The UI customizing information managing part 350, which receives the edited UI customizing information and the update request, updates the contents of the customizing information DB 411 using the received UI customizing information (stops S304 through S307).

Therefore, in this embodiment, the operation screen is customized by editing the UI customizing information which is difference information of the operation screen (function UI content information 131). The UI customizing part 358 may send and update only the UI customizing information related to the modified screen constituent element (button) or, the UI customizing part 358 may send the UI customizing information related to all screen constituent elements belonging to the customized screen or, the UI customizing part 358 may also update the UI customizing information related to the non-modified screen constituent element (that is, the screen constituent element which was not modified).

Figure 10:
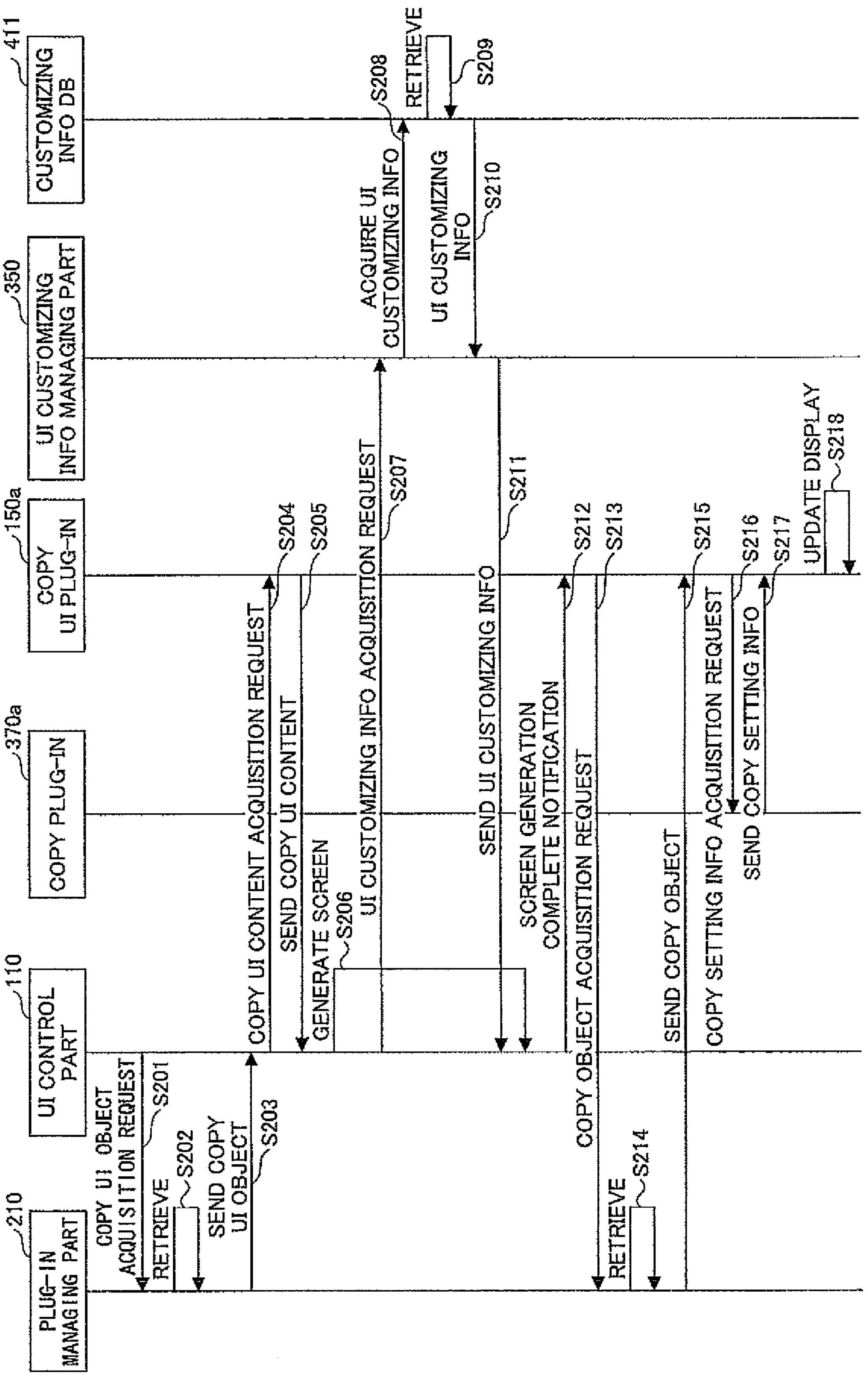
FIG. 10 is a sequence diagram for explaining a processing sequence of an operation screen display process.

Next, a description will be given of a processing sequence of a process to display the operation screen (for example, the top screen 71) of the copy application 301. FIG. 10 is a sequence diagram for explaining the processing sequence of the operation screen display process. The process shown in FIG. 10 is started when a transition occurs in the operation screen of the copy application by an input made by the user, such as pushing of a button, in a state where the operation screen of the application (for example, the facsimile application 303) other than the copy application 301 is displayed on the operation panel 602.

First, the UI control part 110 requests acquisition of the operation object (hereinafter referred to as a "copy UI object") of the copy UI plug-in 150*a*, with respect to the plug-in managing part 210 (step S201). The plug-in managing part 210 retrieves the copy UI object from the plug-in management table storing part 212 which stores the operation objects, using the name of the copy UI plug-in 150*a* as a key (step S202). The plug-in managing part 210 sends the retrieved copy UI object to the UI control part 110 (step S203).

Thereafter, the UI control part 110 requests acquisition of the copy UI content information 151*a*, with respect to the copy UI plug-in 150*a* via the copy UI object (step S204). The copy UI plug-in 150*a* sends the copy UI content information 151*a* belonging thereto to the UI control part 110 (step S205).

The UI control part 110 generates the operation screen of the copy application 301 based on the received copy UI content information 151*a* (step S206). The UI control part 110 requests acquisition of the UI customizing information, with respect to the UI customizing information managing part 350, by also sending the screen constituent element ID of the screen constituent element, if the screen constituent element that is the customizing target (that is, the screen constituent element having the customizing flag with the value "true") is found within the copy UI content information 151*a*, during the process of generating the operation screen (step S207).

The UI customizing information managing part 350, which receives the acquisition request for the UI customizing information, retrieves the requested UI customizing information from the customizing information DB 411 based on the received screen constituent element ID, and sends the retrieved result (UI customizing information) to the UI control part 110 (steps S208 through S211). The UI control part 110 generates the operation screen by merging the acquired UI customizing information with respect to the copy UI content information 151*a*. In other words, the operation screen is generated so that the screen constituent element (button) that is set to the non-displaying state in the UI customizing information is not displayed.

When the generation of the operation screen is completed, the UI control part 110 sends a screen generation completion notification to the copy UI plug-in 150*a* (step S212). The copy UI plug-in 150*a* which receives the screen generation completion notification requests acquisition of the operation object (hereinafter referred to as a "copy object") of the copy plug-in 370*a* which stores setting information (operation condition) with respect to copy application 301, to the plug-in managing part 210, in order to acquire the setting information (operation condition) with respect to the copy application 310 (step S213). The plug-in managing part 210 retrieves the copy object from the plug-in management table storing part 212 which stores the operation objects, based on the name of the copy plug-in 370*a* (step S214). The plug-in managing part 210 sends the retrieved copy object to the copy UI plug-in 150*a* (step S215).

The copy UI plug-in 150*a* requests acquisition of the setting information to the copy UI plug-in 150*a*, via the acquired copy object (step S216). The copy application 301 which receives the acquisition request for the setting information sends to the copy UI plug-in 150*a* the setting information with respect to the copy application 301 at this point in time (step S217). For example, the setting information includes information related to the document size, the color mode at the time of the reading, the paper supply tray or cassette which is to supply the paper, and the like. The copy UI plug-in 150*a*, which receives the setting information, updates the display of the screen based on the setting information (step S218). For example, the display of the button is inverted or, the message is displayed by the updated display of the screen.

Therefore, according to this embodiment, the operation screen is centrally generated by the single UI control part 110 and not by each of the plug-ins. The UI control part 110 generates the customized operation screen based on the UI customizing information.

Figure 11:
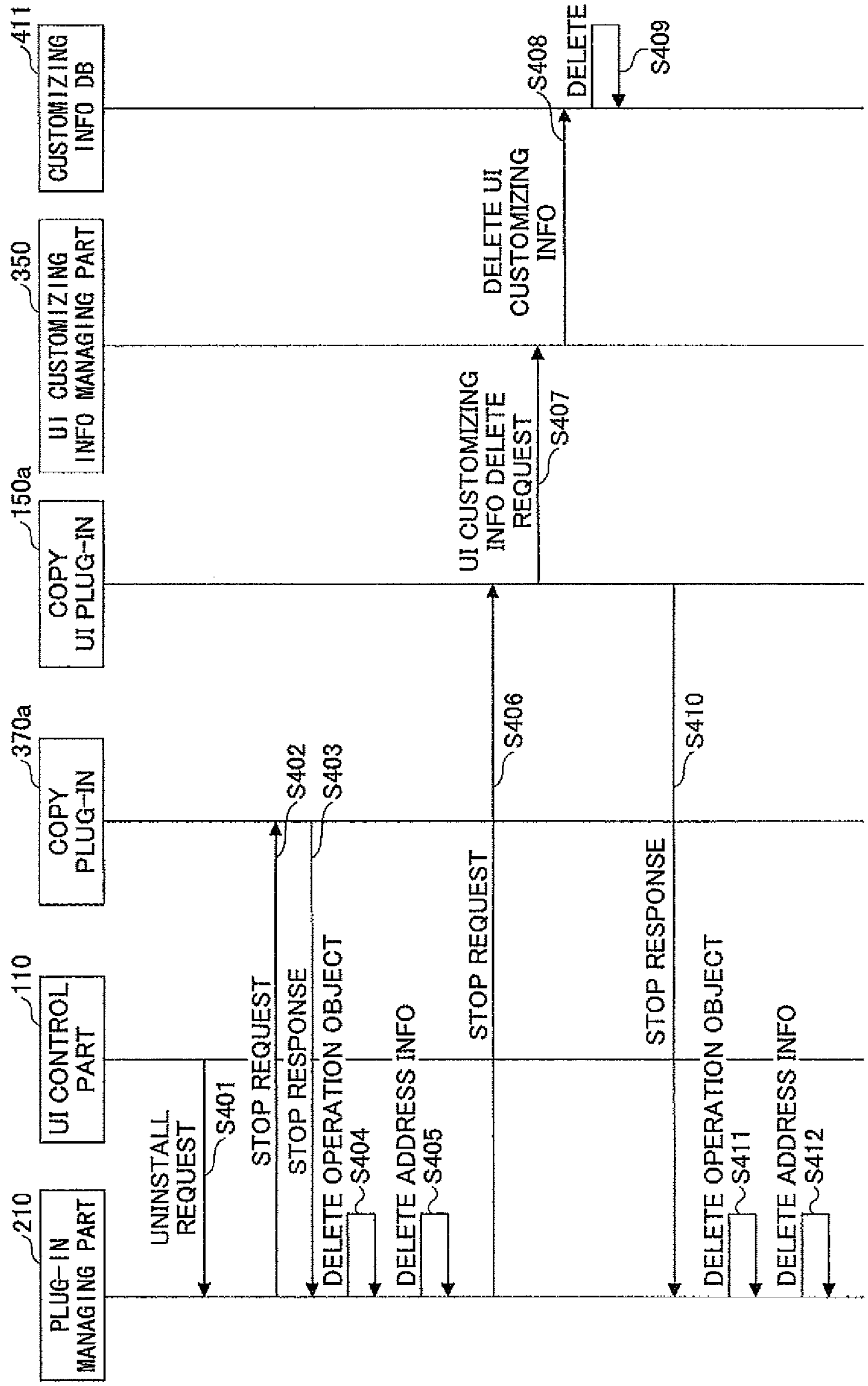
FIG. 11 is a sequence diagram for explaining a processing sequence at the time of a plug-in uninstalling.

Next, a description will be given of a processing sequence at the time of uninstalling a plug-in of the copy application 301. FIG. 11 is a sequence diagram for explaining the processing sequence at the time of the plug-in uninstalling.

For example, when the user selects the "copy application 301" on an uninstall screen which is displayed on the operation panel 602 and pushes an "uninstall" button, the UI control part 110 requests uninstalling of the copy application 301 with respect to the plug-in managing part 210 (step S401). The plug-in managing part 210 sends a stop request with respect to the copy plug-in 370*a* and the copy UI plug-in 150*a* (steps S402 and S403). The stop request may request deletion of the program or, request deletion of the address information of the program from a management table of the storage unit which stores the program.

The copy plug-in 370*a* which receives the stop request carries out a stop preprocess, and sends a stop response to the plug-in managing part 210 after completion of the stop preprocess (step S403). The plug-in managing part 210 which receives the stop response deletes the operation object (copy object) of the copy plug-in 370*a* from the plug-in management table stored in the plug-in management table storing part 212 (step S404). Then, the plug-in managing part 210 deletes the information, such as the address where the plug-in address storing part 211 stores the copy plug-in 370*a* (step S405).

On the other hand, the copy UI plug-in 150*a* which receives the stop request carries out a stop preprocess to request deletion of the UI customizing information of the copy application 301 (copy UI plug-in 150*a*) with respect to the UI customizing information managing part 350 (step S407). The UI customizing information managing part 350 which receives the delete request for UI customizing information deletes the UI customizing information related to the copy plug-in 370*a* from the UI customizing information stored in the customizing information DB 411 (steps S408 and S409). When the deletion of the UI customizing information is completed by the stop preprocess, the copy UI plug-in 150*a* sends a stop response to the plug-in managing part 210 (step S410).

The plug-in managing part 210, which receives the stop response, deletes the operation object (copy UI object) of the copy UI plug-in 150*a* from the plug-in management table stored in the plug-in management table storing part 212 (step S404). Then, the plug-in managing part 210 deletes the information, such as the address where the plug-in address storing part 211 stores the copy plug-in 370*a* (step S405).

Therefore, depending on the uninstalling of the copy application (copy UI plug-in 150*a*), the corresponding UI customizing information is deleted from the customizing information database 411. Consequently, the unnecessary or excessive use of the storage region is prevented.

Next, a description will be given of the exporting and importing of the UI customizing information. As described above, the export process converts the UI customizing information within the customizing information DB 411 into the CSV format or the XML format, and writes the converted UI customizing information in the CSV or XML format, as a file, into the external storage unit (recording medium). The UI customizing information written in the external storage unit may be read and edited by the PC or the like.

The import process converts the UI customizing information which has been written in the external storage unit by the exporting into storage format of the customizing information DB 411, and writes back the UI customizing information in the customizing information DB 411. The import process includes a complete import process which overwrites on all information of the customizing information DB 411 based on the information stored in the external storage unit, and a difference import process which writes back only the data not existing in the customizing information DB 411. Either one of the complete import process and the difference import process may be employed.

The export process and the import process are useful when making a back-up of the UI customizing information or, when using the same UI customizing information in another equipment.

Figure 12:
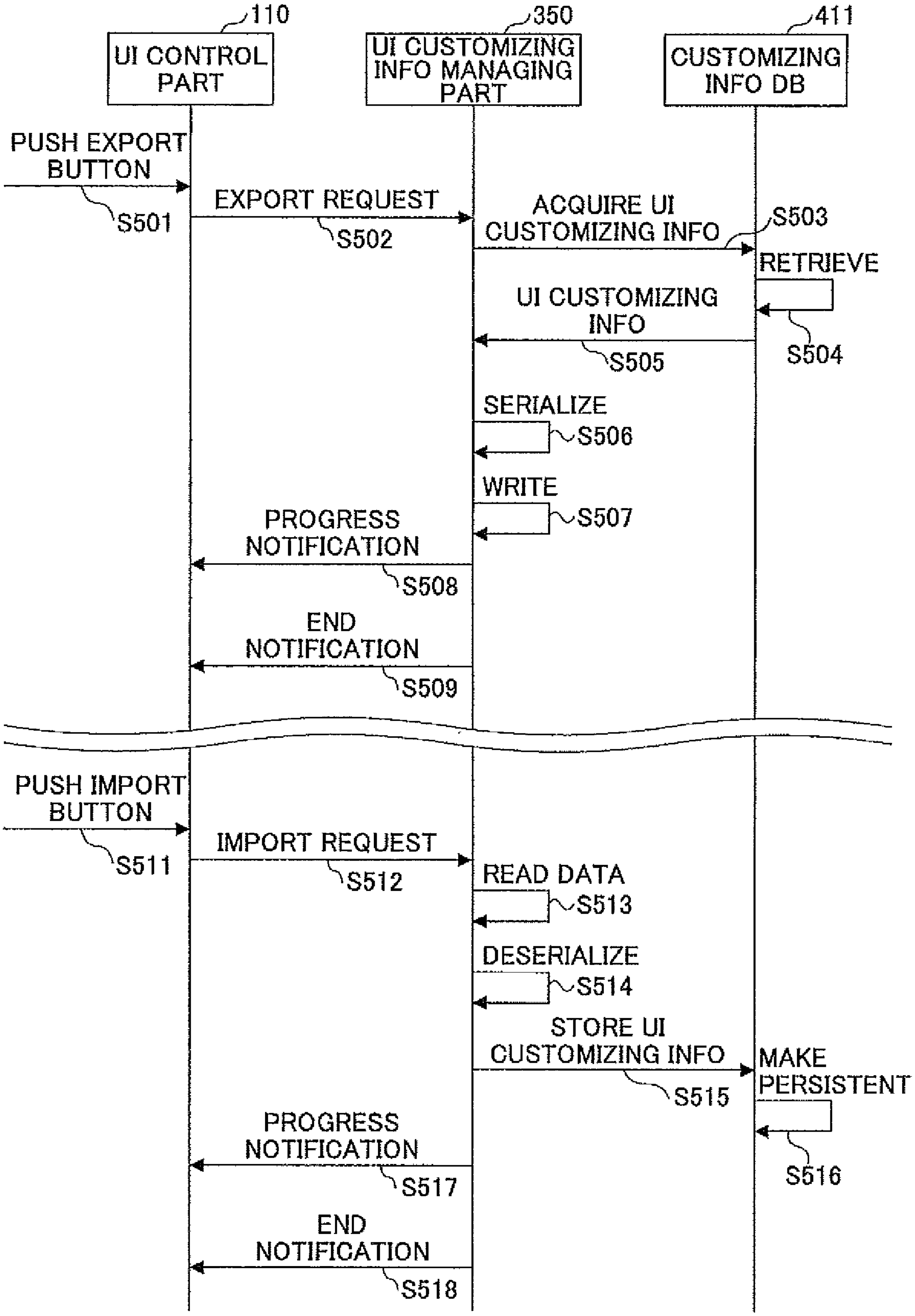
FIG. 12 is a sequence diagram for explaining UI customizing information export process and import process.

FIG. 12 is a sequence diagram for explaining UI customizing information export process and import process.

For example, the UI customizing information is selected as the exporting target, via a screen (export screen) which is displayed on the operation panel 602 and urges the user to input an export request for the UI customizing information, and after an external storage unit to which the exporting target is to be written, a button which instructs the start of the export process is pushed by the user (step S501).

The UI control part 110, which receives the instruction to start the export process, makes an export request that requests exporting of the information for identifying the external storage unit to which the exporting target is to be written, as a parameter, with respect to the UI customizing information managing part 350 which manages the UI customizing information, because the exporting target is the UI customizing information (step S502). The UI customizing information managing part 350, which receives the export request, acquires all UI customizing information from the customizing information DB 411 (steps S503 through S505).

Thereafter, the UI customizing information managing part 350 serializes the acquired UI customizing information, and the UI customizing information is converted into the CSV or XML format, for example (step S506). The UI customizing information managing part 350 writes the serialized UI customizing information to the external storage unit specified by the export request (step S507). In this state, the UI customizing information managing part 350 notifies a write progress state to the UI control part 110 (step S508). Accordingly, the UI control part 110 displays an image (for example, a progress bar) indicating the write progress state on the operation panel 602. When the writing of all UI customizing information ends, the UI customizing information managing part 350 makes an end notification to the UI control part 110 (step S509), and the export progress ends.

Next, a description will be given of the import process, by referring to FIG. 12.

For example, the UI customizing information is selected as the importing target, via a screen (import screen) which is displayed on the operation panel 602 and urges the user to input an import request for the UI customizing information, and after an external storage unit from which the importing target is to be read, a button which instructs the start of the import process is pushed by the user (step S511).

The UI control part 110, which receives the instruction to start the import process, makes an import request that requests importing of the information for identifying the external storage unit from which the exporting target is to be read, as a parameter, with respect to the UI customizing information managing part 350 which manages the UI customizing information, because the importing target is the UI customizing information (step S512). The UI customizing information managing part 350, which receives the import request, reads data from the external storage unit specified by the import request (step S513). The UI customizing information managing part 350 deserializes the read data, and the data is converted from the CSV or XML format into the storage format of the customizing information DB 411 (step S514). The UI customizing information managing part 350 writes back the deserialized data to the customizing information DB 411 (steps S515 and S516). In this state, the UI customizing information managing part 350 notifies a write-back progress state to the UI control part 110 (step S517). Accordingly, the UI control part 110 displays an image (for example, a progress bar) indicating the write-back progress state on the operation panel 602. When the write-back of all UI customizing information ends, the UI customizing information managing part 350 makes an end notification to the UI control part 110 (step S518), and the import progress ends.

In FIG. 12, all UI customizing information stored in the customizing information DB 411 is the export target. However, the export target may be in predetermined units, such as in units of applications (plug-ins) and in units of screens.

In the description given heretofore, no mention is made with respect to the management of the UI customizing information for each user. In actual practice, the functions that are used differ depending on the users. Furthermore, the skills of the users who use the equipment also differ depending on the users. For this reason, it is desirable for the operation screen to be personalized and displayed for each user. Hence, a description will now be given of an example where the structure of the operation screen can be modified depending on the user.

In order to enable modification of the structure of the operation screen depending on the user, a plurality of UI customizing information are made definable with respect to the same operation screen depending on the user.

FIG. 13 is a diagram showing an example of a structure of the customizing information database for a case where the structure of the operation screen is modifiable depending on the user.

In FIG. 13, UI customizing information 13-100 and 13-101 are related to the same operation screen, and are respectively allocated with IDs for specifying the UI customizing information 13-100 and 13-101. In other words, the ID of the UI customizing information 13-100 is "0" and the ID of the UI customizing information 13-101 is "1". The structure of the UI customizing information was described above with reference to FIG. 8.

Relating information 13-001 relates each user registered in the MFP 1 and the UI customizing information used by each user. For example, a user "Taro Ricoh" wishes to utilize all functions of the MFP 1, and for this reason, the UI customizing information 13-101 which has the ID "1" and displays buttons for setting all functions is set as the utilizing target for the user "Taro Ricoh". On the other hand, the UI customizing information 13-100 which has the ID "0" and of the color setting buttons does not display buttons for the full color and automatic color selection is set as the utilizing target for users "Hanako Yamada" and "Taro Nihon".

The UI customizing information used by each user may be selected by each user via the operation panel 602 or, a manager may allocate with respect to each user the UI customizing information that is created in order to restrict functions depending on the rule or the like of the user.

Although the UI customizing information with respect to the entire operation screen for operating the MFP 1 is treated as one set of information in FIG. 13, it is possible to divide and treat the UI customizing information in units of applications (plug-ins) or functions or operation screens, and relate the UI customizing information with respect to each user for each of the divided units.

Furthermore, because FIG. 13 represents the UI customizing information in the form of a simple table, the common data, such as the screen ID, is stored in an overlapping manner. However, the data may be normalized, so that one UI customizing information is managed by a plurality of tables.

Figure 14:
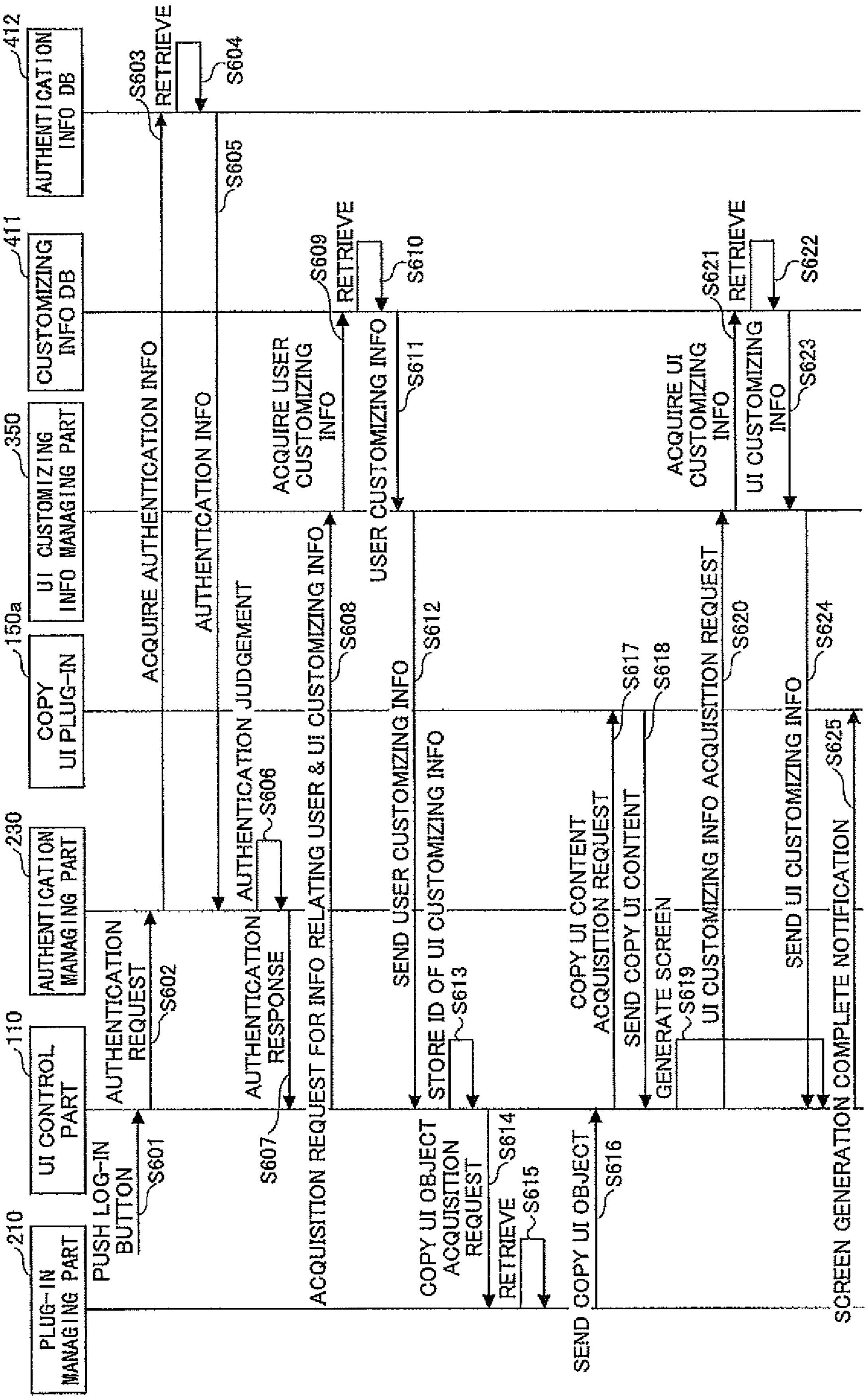
FIG. 14 is a sequence diagram for explaining a processing sequence of an operation screen display process depending on the user.

Next, a description will be given of a processing sequence of an operation screen display process when the UI customizing information is formed as shown in FIG. 13. FIG. 14 is a sequence diagram for explaining the processing sequence of the operation screen display process depending on the user.

For example, the user name and the password are input by the user via a log-in screen that is displayed on the operation panel 602, and a button which instructs the start of the authentication process is pushed by the user (step S601). The UI control part 110, which receives the instruction to start the authentication process, makes an authentication request to the authentication managing part 230 using the user name and the password as parameters (step S602). The authentication managing part 230, which receives the authentication request, retrieves information (pair of user name and password) matching the user name from the authentication information DB 412 (steps S603 through S605). Then, the authentication managing part 230 compares the password set in the information acquired from the authentication information DB 412 and the parameter which is received as the parameter, and judges whether or not the two passwords match (step S606). When the judging ends, the authentication managing part 230 notifies an authentication result to the UI control part 110 as a response to the instruction to start the authentication process (step S607).

If the user authentication is successful, the UI control part 110 makes an acquisition request for the relating information 13-001 (hereinafter referred to as "user customizing information") related to the user who made the log-in, with respect to the UI customizing information managing part 350, using the user name as a retrieval parameter, in order to display an operation screen corresponding to the user who made the log-in (step S608).

The UI customizing information managing part 350, which receives the acquisition request for the user customizing information, retrieves the relating information 13-001 in the customizing information DB 411 using, as the key, the user name specified by the retrieval parameter, and sends the acquired information to the UI control part 110 as the user customizing information of the user who made the log-in (steps S609 through S612). Thereafter, the UI control part 110 acquires and stores the ID of the UI customizing information used by the user who made the log-in, from the acquired user customizing information (step S613).

Then, processes similar to those carried out by the steps S201 through S205 shown in FIG. 10 are carried out by steps S614 through S618.

Next, the UI control part 110 generates the operation screen of the copy application 301 based on the copy UI content information 151*a* (step S619). When the UI control part 110 finds a screen constituent element (that is a screen constituent element having a customizing flag with a value "true") which is the customizing target within the copy UI content information 151*a* during the process of generating the operation screen, the UI control part 110 makes an acquisition request for the UI customizing information with respect to the UI customizing information managing part 350, using the ID of the stored UI customizing information and the screen constituent element ID as the parameters (step S620).

The UI customizing information managing part 350, which receives the UI customizing information acquisition request, retrieves the relating information 13-001 and the like from the customizing information DB 411, based on the ID of the UI customizing information and the screen constituent element ID, and sends a retrieved result (user customizing information) to the UI control part 110 (steps S619 through S624).

The process carried out thereafter is similar to the process of the step S212 shown in FIG. 10 described above, and a description thereof will be omitted.

Therefore, according to this embodiment, it is possible to display operation screens having different structures depending on the user.

In the case where the UI customizing information has the structure shown in FIG. 13, if a certain plug-in (for example, the plug-in of the copy application 301) is uninstalled, the UI customizing information amounting to all users may be deleted from the customizing information DB 412 in the process shown in FIG. 11 with respect to the certain plug-in which is the uninstalling target.

In addition, a name which facilitates the user to identify the content of each UI customizing information may be set to each UI customizing information. Moreover, instead of deleting the UI customizing information in units of applications (plug-ins), it is possible to delete the UI customizing information in units of users. In this case, it is possible to horizontally delete the UI customizing information by spanning a plurality of plug-ins.

Furthermore, the exporting and importing may be enabled in units of users. In this case, the UI customizing information related to the user who requests the exporting is exported, and the UI customizing information related to the user who requests the importing is written back.

The UI customizing information managing part 350 is one of the plug-ins. Hence, the UI customizing information managing part 350 may be appropriately installed or uninstalled if necessary. Hence, a situation may occur where the UI customizing information managing part 350 does not exist in the MFP 1. Next, a description will be given of the processing sequence for such a case.

Figure 15:
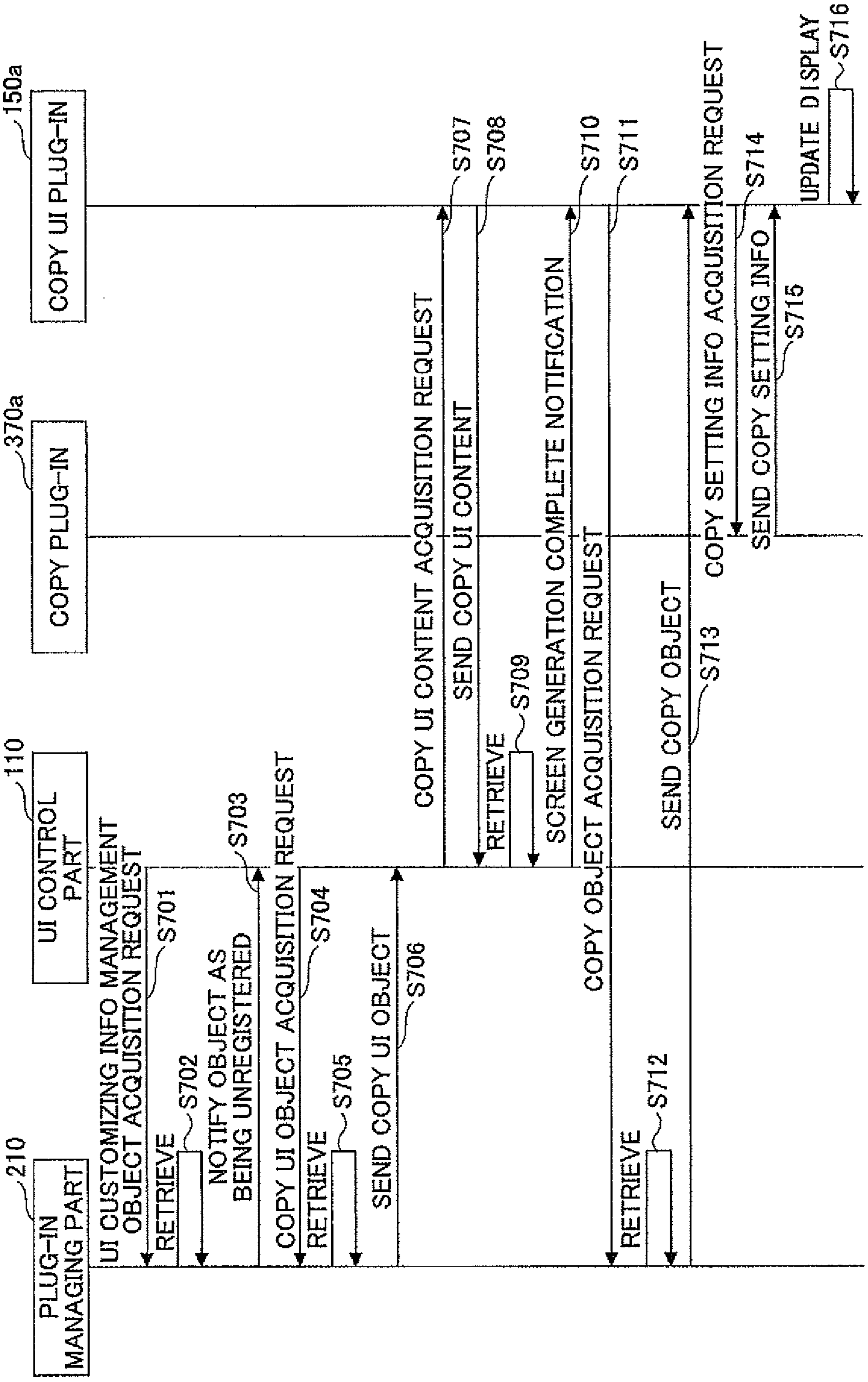
FIG. 15 is a sequence diagram for explaining a processing sequence of the operation screen display process for a case where a UI customizing information managing part is not installed.

FIG. 15 is a sequence diagram for explaining the processing sequence of the operation screen display process for the case where the UI customizing information managing part is not installed. FIG. 15 shows an example where the operation screen of the copy application 301 is displayed when starting the MFP 1. In other words, it is assumed for the sake of convenience in FIG. 15 that the operation screen that is initially displayed when the MFP 1 is started is the operation screen of the copy application 301.

When the MFP 1 is started, the UI control part 110 requests acquisition of the operation object (hereinafter referred to as "UI customizing information management object") of the UI customizing information managing part 350 with respect to the plug-in managing part 210 (step S701). The plug-in managing part 210 retrieves the UI customizing information management object from the operation objects stored in the plug-in management table storing part 212 (step S702). Because the plug-in of the UI customizing information managing part 350 is not installed in this state, it is impossible to find the UI customizing information management object. Accordingly, the plug-in managing part 210 notifies the UI control part 110 that the UI customizing information management object is not registered (step S703). In response to the notification from the plug-in managing part 210, the UI control part 110 stores information indicating that the UI customizing information management object is not registered.

Next, because the precondition in this particular example is that the initial application is the copy application 301, the UI control part 110 requests acquisition of the copy UI object with respect to the plug-in managing part 210 (step S704). The plug-in managing part 210 retrieves the copy UI object from the operation objects stored in the plug-in management table storing part 212 (step S705), and sends the retrieved copy UI object to the UI control part 110 (step S706).

Thereafter, steps S707 and S708 carry out processes similar to the processes carried out by the steps S204 and S205 shown in FIG. 10, and the UI control part 110 acquires the copy UI content information 151*a*. Then, the UI control part 110 generates the operation screen (top screen 71) of the copy application 301 based on the received copy UI content information 151*a* (step S709). In this state, unlike the case shown in FIG. 10, the UI control part 110 does not have the UI customizing information management object, and thus, does not retrieve the screen constituent element which becomes the customizing target within the copy UI content information 151*a*. Hence, the operation screen having the basic structure (default structure) is generated solely by the information contained in the copy UI content information 151*a*.

The processing sequence after the generation of the operation screen is completed (step S710 and subsequent steps), is similar to the processing sequence of the step S212 and subsequent steps in FIG. 10, and a description thereof will be omitted.

As described above, according to the MFP 1 of this embodiment, the UI customizing information of each plug-in that is installed is centrally managed by the single UI customizing information managing part 350. In addition, the operation screen of each plug-in is centrally generated by the single UI control part 110 based on the UI customizing information and the screen constituent information (function UI content information 151) which is used as the basic structure (predefined structure) of the operation screen of the plug-in. Therefore, the developer of each plug-in only needs to define the screen constituent information, and there is no need to implement the logic related to the customizing in the plug-in. Consequently, the developing operation becomes efficient, and it is possible to provide a customizing means that ensures unity.

In addition, the exporting and importing of the UI customizing information are centrally carried out by the single UI customizing information managing part 350, and thus, it is unnecessary to implement logics related to the exporting and importing of the UI customizing information for each plug-in. Moreover, even if the data format of the data that is exported and imported is changed, the effect of this change is limited to the UI customizing information managing part 350, and there is no need to modify the source code of each plug-in.

Furthermore, because it is possible to make different UI customizing information correspond to the users depending on the users, an optimum operation screen can be provided for each user, to thereby improve the accessibility.

In the embodiment described above, the displaying and non-displaying states of the buttons are switched as an example of the customizing content. However, the screen constituent element which becomes the customizing target is not limited to the such buttons. In addition, the customizing content is also not limited to the above, and the present invention is similarly applicable to various modifications, including the modification of the arrangement (or layout) positions of the buttons, the size of the buttons, the shape of the buttons, and the color of the buttons. Of course, the information that is managed by the UI customizing information needs to be changed depending on the customizing content. In other words, information indicating the coordinate information of the arrangement (or layout) positions, the size, the shape and the color may be managed in place of the displaying state that is managed in the described embodiment.

Moreover, the customizing information DB 411 does not need to be provided in each MFP 1. For example, it is possible to centrally manage the UI customizing information with respect to a plurality of MFPs 1 in a single computer which is coupled to the plurality of MFPs 1 via one or more networks. In this case, it is possible to customize the operation screens of the plurality of MFPs 1 by editing the UI customizing information that is centrally managed by the single computer.

Second Embodiment

In the image forming apparatus, the size of a display region (touch panel) of the operation panel is limited. For this reason, the setting information with respect to a single application is often input using transitions to a plurality of screens.

However, the conventional customizing method merely changes the display format of each display part within each screen, and the degree of freedom of the customizing is not very high. For example, it is impossible to freely make a horizontal customizing spanning a plurality of screens which are capable of making transitions to another screen, such as moving a button display on one screen to another screen.

Next, a description will be given of a second embodiment of the present invention, which improves the degree of freedom of the customizing of the screen.

The hardware structure of the image forming apparatus in this embodiment is the same as that shown in FIG. 1, and a description thereof will be omitted.

Figure 16:
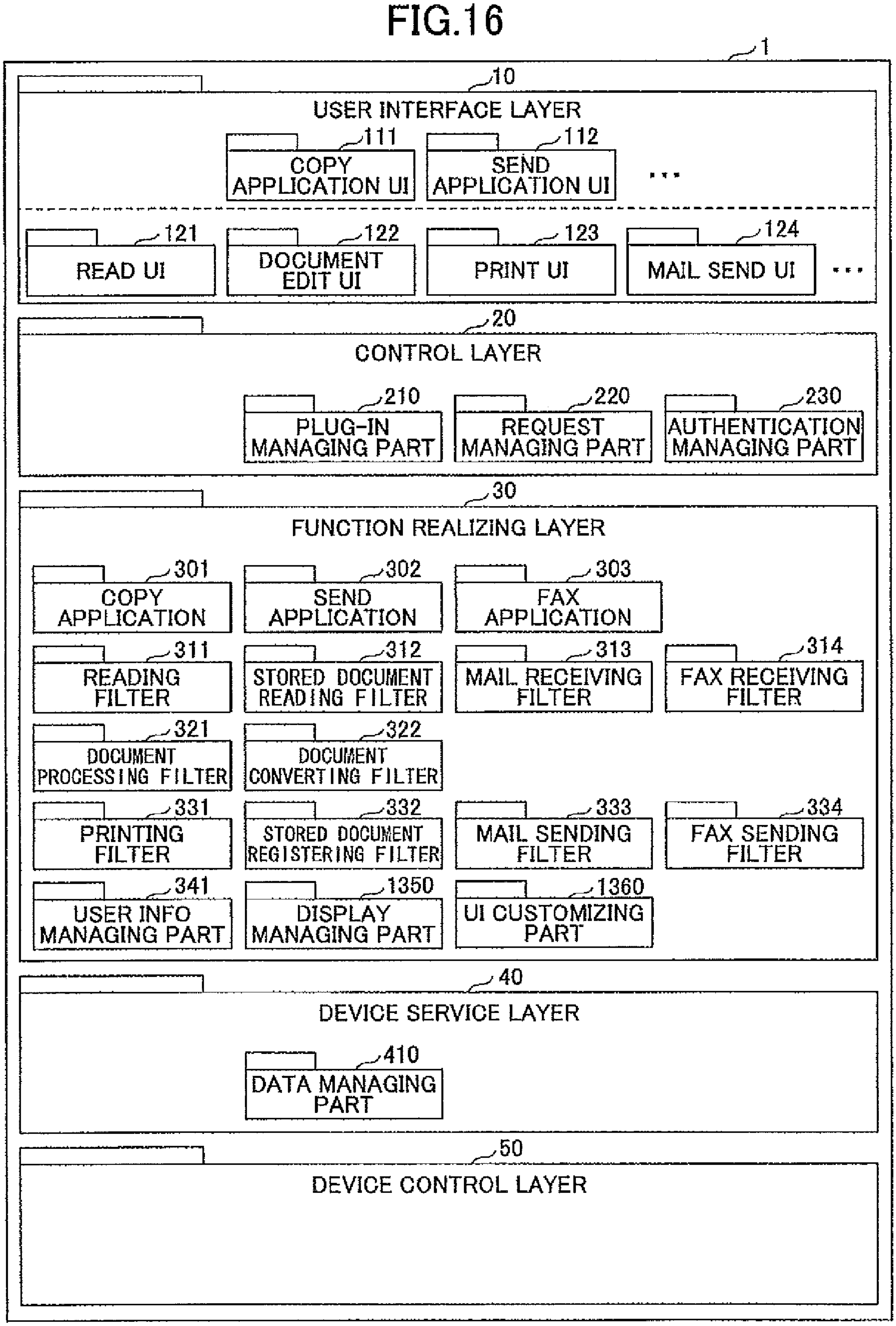
FIG. 16 is a diagram showing a software structure of the image forming apparatus in a second embodiment of the present invention.

FIG. 16 is a diagram showing a software structure of the image forming apparatus in the second embodiment of the present invention. In FIG. 16, those parts that are the same as those corresponding parts in FIG. 2 are designated by the same reference numerals, and a description thereof will be omitted.

The concept of the pipe and filter architecture used in this embodiment is the same as that described above in conjunction with FIG. 3.

In FIG. 16, the user interface layer 10 is implemented with the functions which accept job execution requests such as execution requests for copy, print, scan and facsimile transmission. The job execution request that is accepted in the user interface layer 10 is sent to the control layer 20. Each software part or program module (hereinafter simply referred to as "component") included in the user interface layer 10 will be described later.

The plug-in managing part 210 of the control layer 20 manages the installing and uninstalling of the components with respect to the MFP 1, and the correspondence information between the name and the physical address (storage location information) of component that is installed.

The function realizing layer 30 includes the user information managing part 341, a display managing part 1350 and a UI customizing part 1360.

The user information managing part 341 registers (makes persistent), in the data managing part 410, the authentication information, such as the user name and the password of the user for making the log-in to the MFP 1, and performs the referring, updating, deleting and retrieving. The display managing part 1350 manages information related to the display of the operation screen with respect to each application and each filter. The UI customizing part 1360 controls the customizing process which customizes the operation screen of each application.

In FIG. 16, the user interface layer 10 includes UI components such as a copy application UI 111, a send application UI 112, a read UI 121, a document edit or 122, a print UI 123, and a mail send UI 124. The UI component carries out a process related to the display of the application or filter in the function realizing layer 30, and forms a pair with the application or filter.

The UI component corresponding to the application is referred to as an "application UI component". In FIG. 16, the copy application UI 111 and the send application UI 112 are shown as examples of the application UI components. In other words, the copy application UI 111 is the UI component of the copy application 301, and the send application UI 112 is the UI component of the send application 302.

On the other hand, the UI component corresponding to the filter is referred to as a "filter UI component". In FIG. 16, the read UI 121, the document edit UI 122, the print UI 123, and the mail send UI 124 are shown as examples of the filter UI component. In other words, the read UI 121, the document edit UI 122, the print UI 123 and the mail send UI 124 respectively are the UI components of the reading filter 311, the document processing filter (or document editing filter) 321, the printing filter 331 and the mail sending filter 333.

In FIG. 16, the illustration of the UI components with respect to some of the applications or filters is omitted for the sake of convenience.

Figure 17:
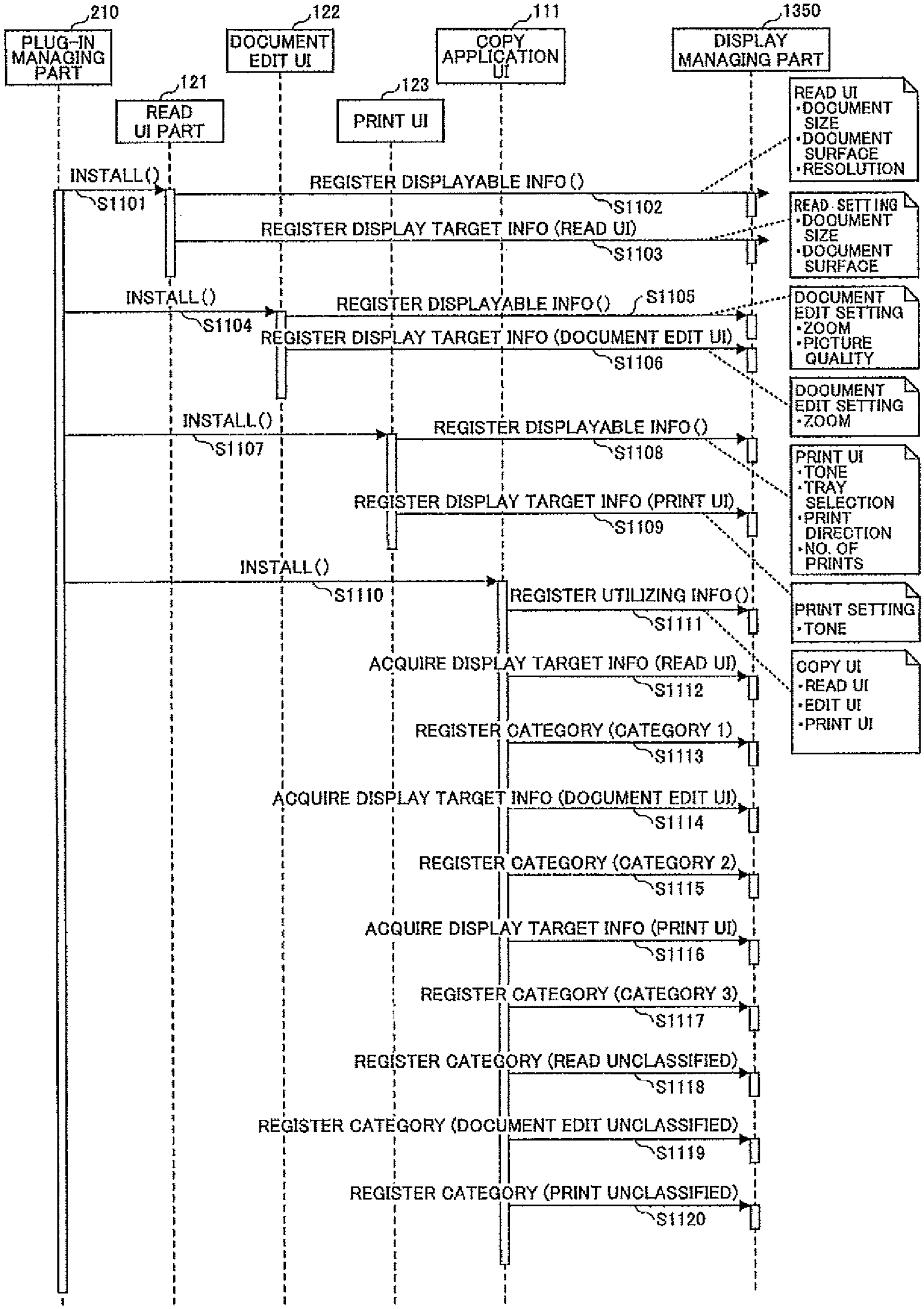
FIG. 17 is a sequence diagram for explaining a processing sequence of a UI component installing process.

Next, a description will be given of the processing sequence of the MFP 1 of this embodiment. FIG. 17 is a sequence diagram for explaining the processing sequence of a UI component installing process. FIG. 17 shows the installing process for the read UI 121, the document edit UI 122, the print UI 123 and the copy application UI 111. The installing of the UI component is executed together with the installing of the corresponding application or filter, but the illustration of the installing procedure for the application and filter is omitted in FIG. 17.

When the plug-in managing part 210 installs the read UI 121 (step S1101), the read UI 121 registers displayable information and display target information with respect to the display managing part 1350 (step S1102). The read UI 121 includes the displayable information and the display target information or, the displayable information and the display target information are related to the read UI 121 (for example, formed as a package). The displayable information defines the structure of all setting items which can be displayed on the operation screen as the setting item with respect to the filter, that is, all setting items which can be set in the filter. The display target information defines the structure of the setting item which is actually set as the display target in an initial state (state where the operation screen has not been customized), of the displayable information.

FIG. 18 is a diagram showing an example of the displayable information of the read UI. FIG. 18 shows an example where the displayable information is written in the XML format.

In FIG. 18, the displayable information includes function elements as root elements. The value of a name attribute of the function element indicates an identifier (component name) of the UI component corresponding to the displayable information. In other words, "scanui" indicates the component name of the read UI 121.

The function element includes one or more item elements as child elements. One item element corresponds to one setting item. The value of the item element indicates the identifier of the corresponding setting item. In addition, the value of a string attribute of the item element indicates a displaying character string of the corresponding setting item. In FIG. 18, 3 item elements "document size", "document surface" and "resolution" are defined. Accordingly, it may be seen that 3 setting items are displayable as the read UI 121 (that is, as the setting items of the reading filter 311).

FIG. 19 is a diagram showing an example of the display target information of the read UI. The format of the display target information is approximately the same as the format of the displayable information. However, the display target information includes a name element as the child element of the function element. The value (read setting) of the name element is a name with respect to a set of setting items that are the display targets in the display target information.

Of the 3 item elements of the displayable information in the display target information shown in FIG. 19, only 2 item elements are child elements of the function element. In other words, in this display target information, only 2 setting items "document size" and "document surface" are defined as the display targets in the initial state.

In the installing process of other filter UI components executed thereafter, the displayable information and the display target information of the other filter UI components are registered in the display managing part 1350, similarly as in the case of the read UI 121 (steps S1104 through S1109). It is assumed for the sake of convenience that the displayable information of the document edit UI 122 includes "magnification (or zoom)" and "picture quality" and the display target information of the document edit UI 122 includes "picture quality" as the setting items. In addition, it is assumed for the sake of convenience that the displayable information of the print UI 123 includes "tone", "tray selection" and "print direction" and the display target information of the print UI 123 includes "tone" as the setting items. The display managing part 1350 stores and manages the registered displayable information and display target information in the HDD 633, for example.

Next, when the plug-in managing part 210 executes the installing of the copy application UI 111 (step S1110), the copy application UI 111 registers utilizing information with respect to the display managing part 1350 (step S1111). The copy application UI 111 includes the utilizing information or, the utilizing information is related to the copy application UI 111 (for example, formed as a package). The utilizing information defines a utilization relationship between the application UI component and the filter UI component. In other words, the application in the MFP 1 is formed by a combination of a plurality of filters. Hence, the utilization relationship exists between the application and the filters. For example, the copy application 301 utilizes the reading filter 311, the document editing filter 321 and the printing filter 331. This utilization relationship affects the user interface, and appears as the utilization relationship between the application UI component and the filter UI component.

FIG. 20 is a diagram showing an example of the utilizing information of the copy application UI. FIG. 20 shows an example written in the XML format.

In FIG. 20, the utilizing information includes component elements as root elements. The value of the name attribute of the component element indicates the identifier (component name) of the application UI component to which the utilizing information corresponds. In other words, "copyaplui" indicates the component name of the copy application UI 111.

The component element includes one or more subcomponent elements as child elements. The value of the subcomponent element indicates the component name of the filter UI component utilized by the application UI component (copy application UI 111). FIG. 20 shows a case where 3 subcomponent elements "scanui", "editui" and "printui" are defined. The 3 subcomponent elements "scanui", "editui" and "printui" respectively correspond to the read UI 121, the document edit UI 122 and the print UI 123.

The display managing part 1350 stores and manages the registered utilizing information in the HDD 633, for example. The information registered in the display managing part 1350 by the processes described above has the following structure.

Figure 21:
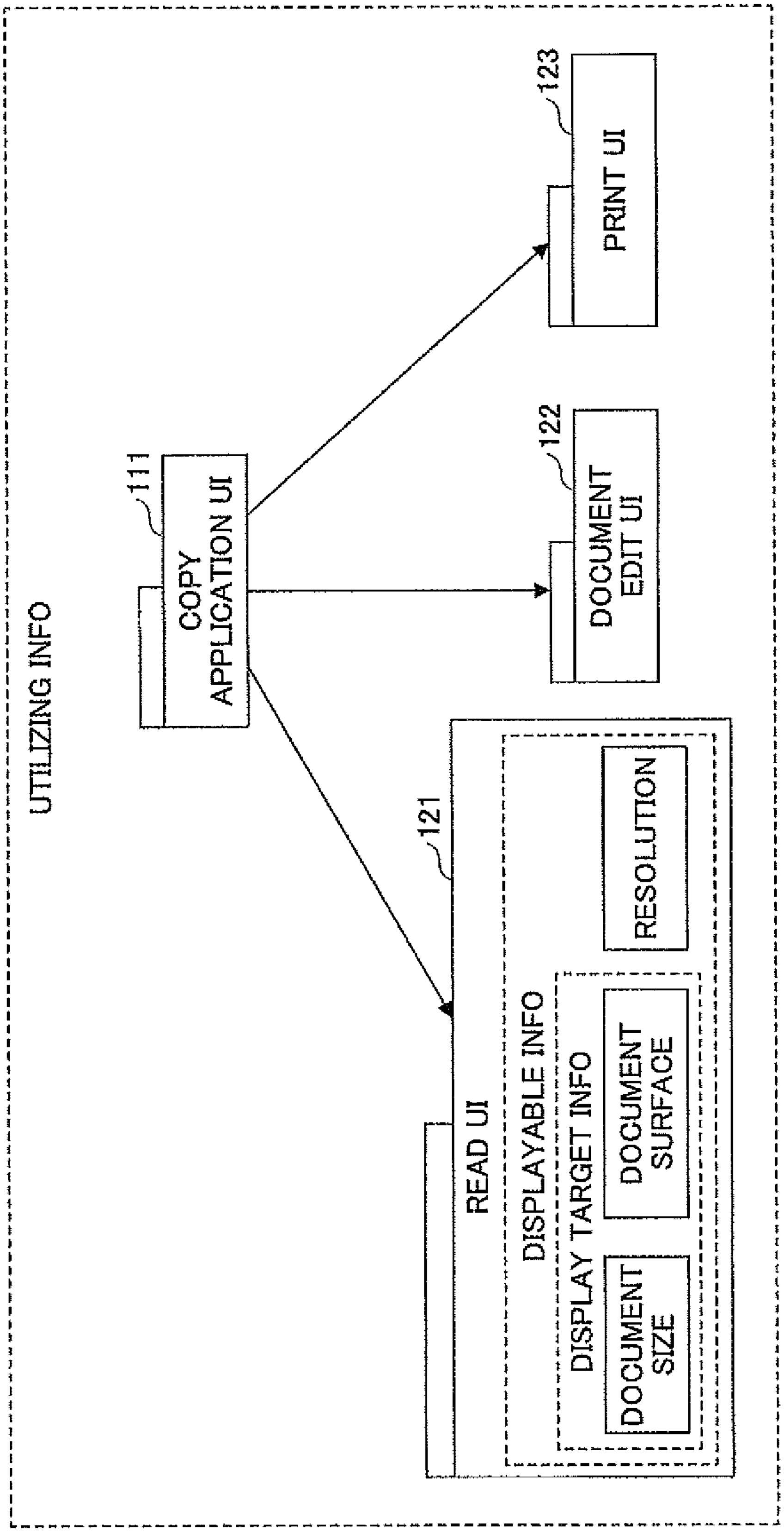
FIG. 21 is a diagram showing a structure of information registered in a display managing part.

FIG. 21 is a diagram showing the structure of the information registered in the display managing part. As shown in FIG. 21, it is defined in the utilizing information of the copy application UI 111 that the copy application UI 111 utilizes the read UI 121, the document edit UI 122 and the print UI 123. In addition, in the displayable information of the read UI 121, it is defined that the setting items of the document size, the document surface and the resolution are displayable. Further, in the display target information of the read UI 121, it is defined that the setting items of the document size and the document surface are display targets. For the sake of convenience, the illustration of the displayable information and the display target information of the document edit UI 122 and the print UI 123 is omitted in FIG. 21.

After the step S1111 in FIG. 17, the copy application UI 111 acquires the display target information of the filter UI component (read UI 121) that is defined first as the utilizing target in the utilizing information, from the display managing part 1350, based on the component name of the read UI 121 (step S1112). Then, the copy application UI 111 requests the display managing part 1350 to register (cause to correspond to) the setting item included in the acquired display target information in a "category 1" of the copy application UI 111 (step S1113). In addition, in this state, the copy application UI 111 registers in the display managing part 1350 information indicating that the value ("read setting" in FIG. 19) of the name element in the acquired display target information is set as the name (category name) of the category 1.

The "category" refers to a general concept (unit) corresponding to one sheet among a plurality of sheets forming the operation screen of the application. In other words, the request made in the step S1113 allocates the setting item included in the display target information of the read UI 121 to the first sheet of the operation screen of the copy application 301.

Similarly, the copy application UI 111 registers the value of the name element and the setting item included in the display target information of the other filter UI components that are utilized to different categories. That is, the values of the name element and the setting items included in the display target information of the other filter UI components are allocated to different sheets. Hence, the copy application UI 111 acquires the display target information of the filter UI component (document edit UI 122) which is defined as the second utilizing target in the utilizing information, from the display managing part 1350, based on the component name of the document edit UI 122 (step S1114). Thereafter, the copy application UI 111 requests the display managing part 1350 to register the value of the name element and the setting item included in the acquired display target information in a "category 2" of the copy application UI 111 (step S1115). In addition, the copy application UI 111 acquires the display target information of the filter UI component (print UI 123) which is defined as the third utilizing target in the utilizing information, from the display managing part 1350, based on the component name of the print UI 123 (step S1116). Then, the copy application UI 111 requests the display managing part 1350 to register the value of the name element and the setting item included in the acquired display target information in a "category 3" of the copy application UI 111 (step S1117).

The display managing part 1350 stores the correspondence information (information causing correspondence between the setting item and the category) which is requested to be registered for each category in the HDD 633.

Next, the copy application UI 111 registers unclassified categories (read unclassified, document edit unclassified and print unclassified) in the display managing part 1350 for each of the filter UI components (read UI 121, document edit UI 122 and print UI 123) that are utilized by the copy application UI 111 (steps S1118 through S1120). The significance of the unclassified categories will be described later in the specification.

By the processes of the steps S1112 through S1120, the following category information is registered in the display managing part 1350 with respect to the copy application UI 111.

Figure 22:
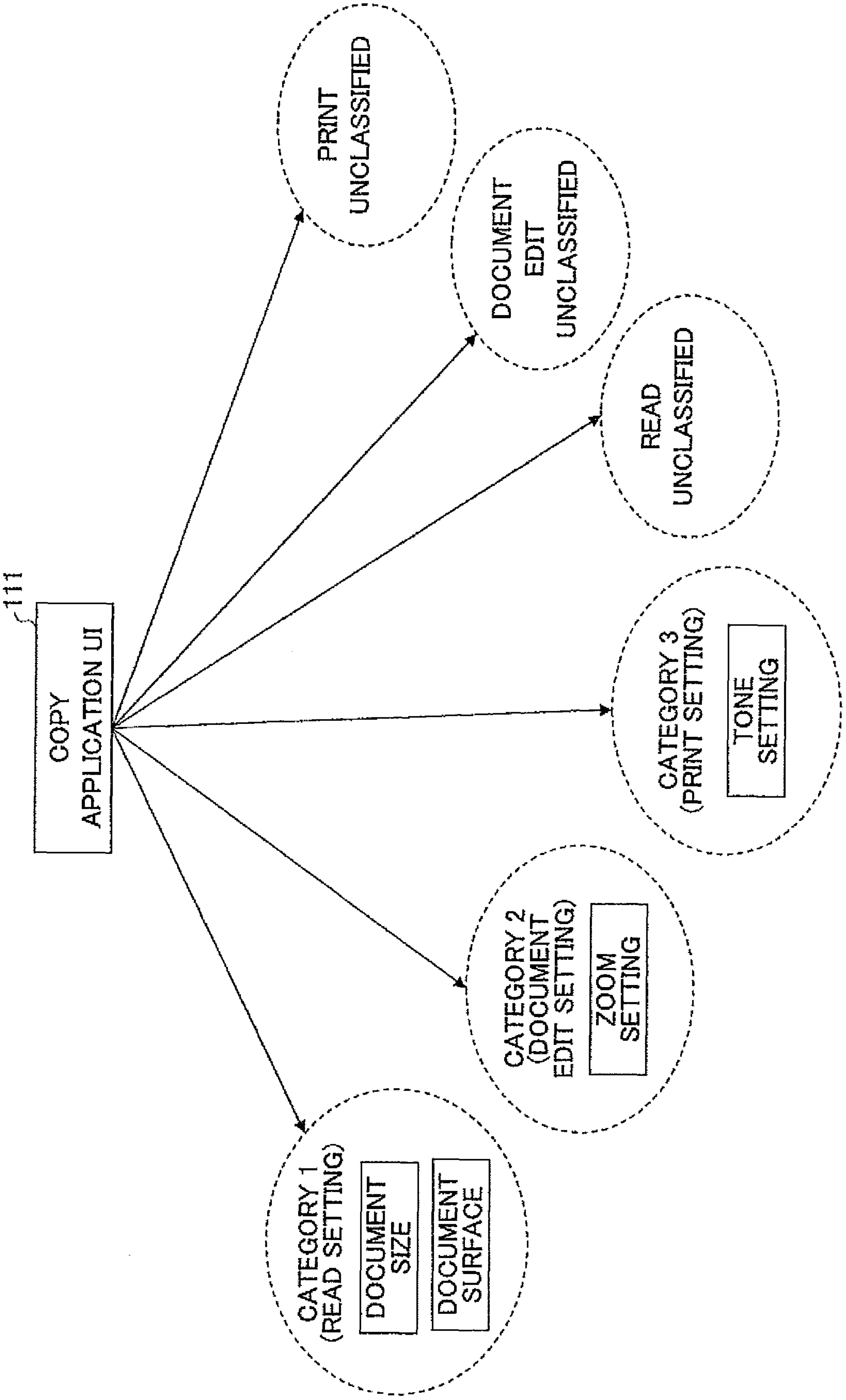
FIG. 22 is a diagram showing category information registered with respect to the copy application UI.

FIG. 22 is a diagram showing the category information registered with respect to the copy application UI. As shown in FIG. 22, the categories registered in the copy application UI 111 include the category 1, the category 2, the category 3, the read unclassified, the document edit unclassified and the print unclassified. The category name "read setting", the setting items "document size" and "document surface" are registered in the category 1. In addition, the category name "document edit setting" and the setting item "magnification" are registered in the category 2. Further, the category name "print setting" and the setting item "tone" are registered in the category 3. At this stage, however, nothing is registered in each of the unclassified categories.

In FIG. 17, the process related to the copy application UI 111 is executed in a similar manner when each of the application UI components is installed. Accordingly, when the send application UI 112 is installed, for example, the category 1, the category 2 and the category 3 are registered with respect to the send application UI 112. Moreover, the unclassified categories (read unclassified, document edit unclassified and mail send unclassified) for each filter UI component utilized by the send application UI 112 are also registered.

The display managing part 1350 generates information (hereinafter referred to as "reverse lookup information") which indicates the category to which the setting item belongs for each of the setting items, depending on the registration of each category, and stores the reverse lookup information in the HDD 633.

Figure 23:
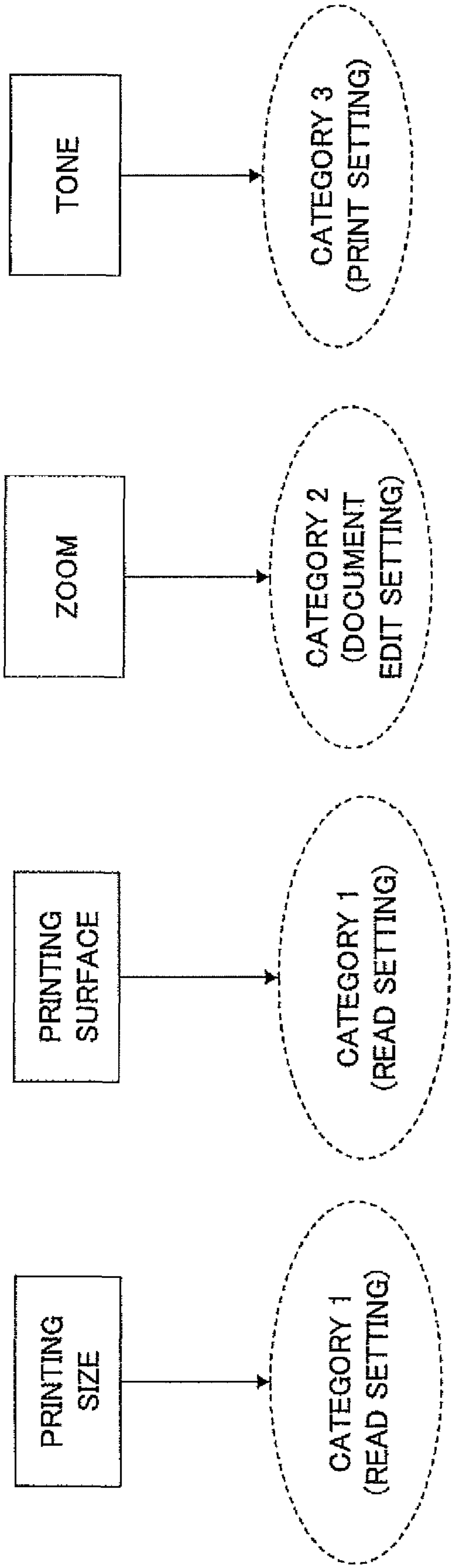
FIG. 23 is a diagram showing reverse lookup information.

FIG. 23 is a diagram showing the reverse lookup information. FIG. 23 shows the reverse lookup information corresponding to FIG. 22. As shown in FIG. 23, by use of the reverse lookup information, it is possible to efficiently specify the category to which each setting item, that is the display target, belongs.

Figure 24:
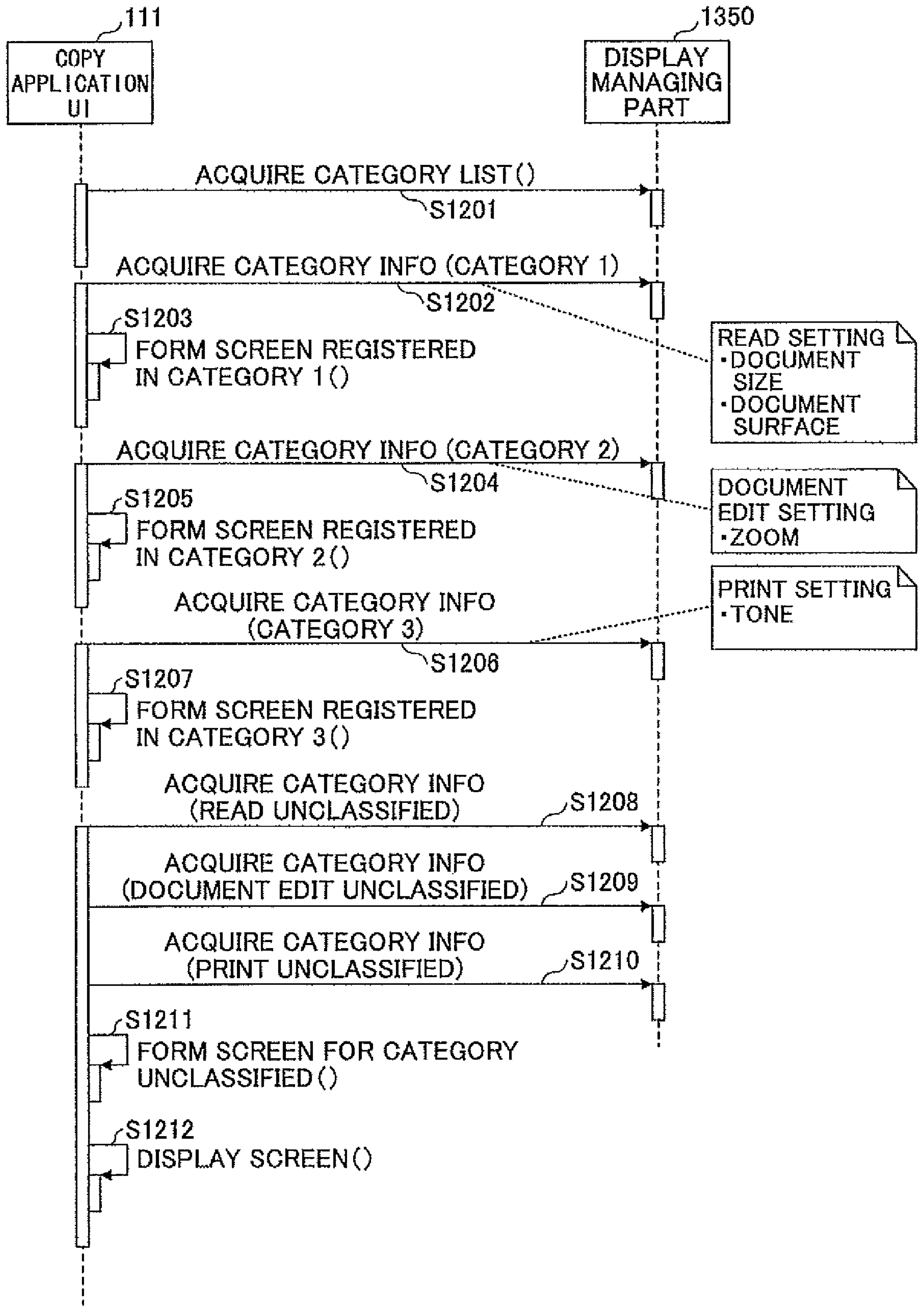
FIG. 24 is a sequence diagram for explaining a processing sequence of an operation screen generating process which generates the operation screen of the copy application.

Next, a description will be given of a processing sequence of an operation screen generating process for generating the operation screen of the application. FIG. 24 is a sequence diagram for explaining the processing sequence of the operation screen generating process which generates the operation screen of the copy application.

For example, when the user inputs a display request for the operation screen (copy screen) of the copy application 301 via the operation panel 602, the copy application UI 111 acquires list information of the categories which are registered with respect to the copy application UI 111 from the display managing part 1350 (step S1201). As shown in FIG. 22, the list information acquired in this case includes the category 1, the category 2, the category 3, the read unclassified, the document edit unclassified and the print unclassified.

Then, the copy application UI 111 generates a screen (sheet) corresponding to each category, separately for each category included in the acquired list information. First, the copy application UI 111 acquires category information registered in the category 1 from the display managing part 1350 (step S1202). Thereafter, the copy application UI 111 generates a sheet corresponding to the category 1, using the setting item included in the acquired category information as the display target (step S1203). In this state, the copy application UI 111 regards a display character string of a heading (tab) of the sheet as the category name of the category 1. The copy application UI 111 generates the sheets and the tabs thereof based on the respective registered category information, similarly for the category 2 and the category 3 (steps S1204 through S1207).

Next, the copy application UI 111 acquires information registered in each of the unclassified categories (in this case, the read unclassified, the document edit unclassified and the print unclassified) from the display managing part 1350 (steps S1208 through S1210). Thereafter, the copy application UI 111 assembles the information acquired from each of the unclassified categories, and generates a single unclassified sheet for displaying the assembled information (setting item) (step S1211). In this state, the copy application UI 111 sets the display character string of the tab of this sheet as "unclassified". In other words, the sheet is not generated for each of the unclassified categories, and a single sheet is generated with respect to a plurality of unclassified categories. At this stage, nothing is registered in each of the unclassified categories, as shown in FIG. 22, and thus, an empty sheet is generated.

Then, the copy application UI 111 displays a copy screen including each of the generated sheets on the operation panel 602 (step S1212).

Figure 25:
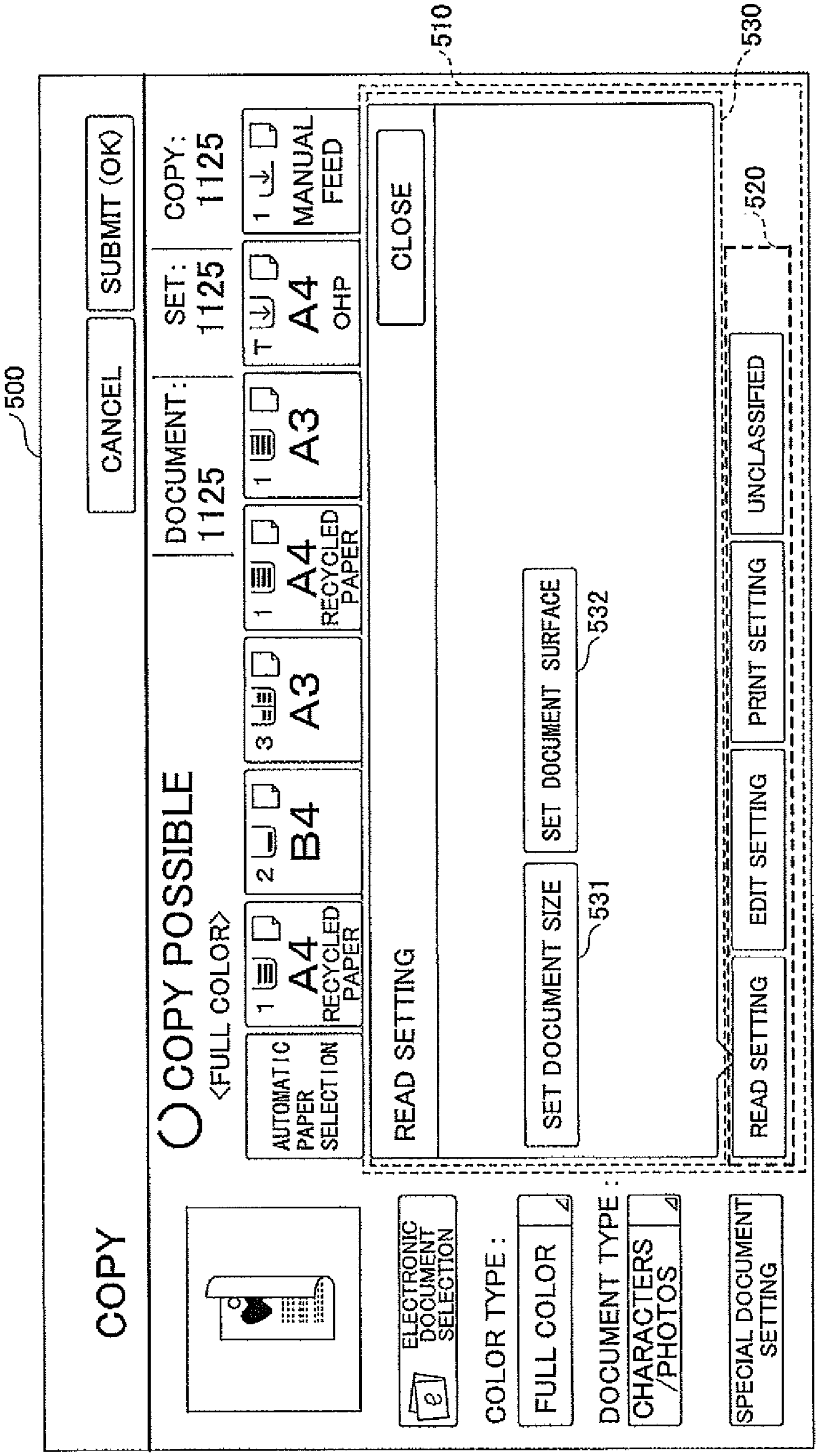
FIG. 25 is a diagram showing an example of a display of a copy screen.

FIG. 25 is a diagram showing an example of the display of the copy screen. In a copy screen 500 shown in FIG. 25, a region surrounded by a dotted line 510 indicates a customizable region (hereinafter referred to as "customizing region 510"). The procedure for generating this customizing region 510 was described above in conjunction with FIG. 24.

The customizing region 510 includes a category list display region 520 and a category display region 530. The tabs of the sheets generated with respect to each of the categories are arranged in the category list display region 520. FIG. 25 shows 4 tables "read setting", "document edit setting", "print setting" and "unclassified". These 4 tabs are provided with respect to the sheets generated in the steps S1203, S1205, S1207 and S1211 shown in FIG. 24.

The sheet which is presently selected by the operation of the tab is displayed in the category display region 530. FIG. 25 shows a state where the read setting tab is selected. Hence, the display parts (buttons 531 and 532) corresponding to the setting items registered in the category 1 are displayed in the category display region 530.

A description will now be given of the customizing (that is, editing of the corresponding relationship of the categories and the setting items) of the customizing region 510. This customizing is carried out via a customizing screen that is displayed on the operation panel 602.

Figure 26:
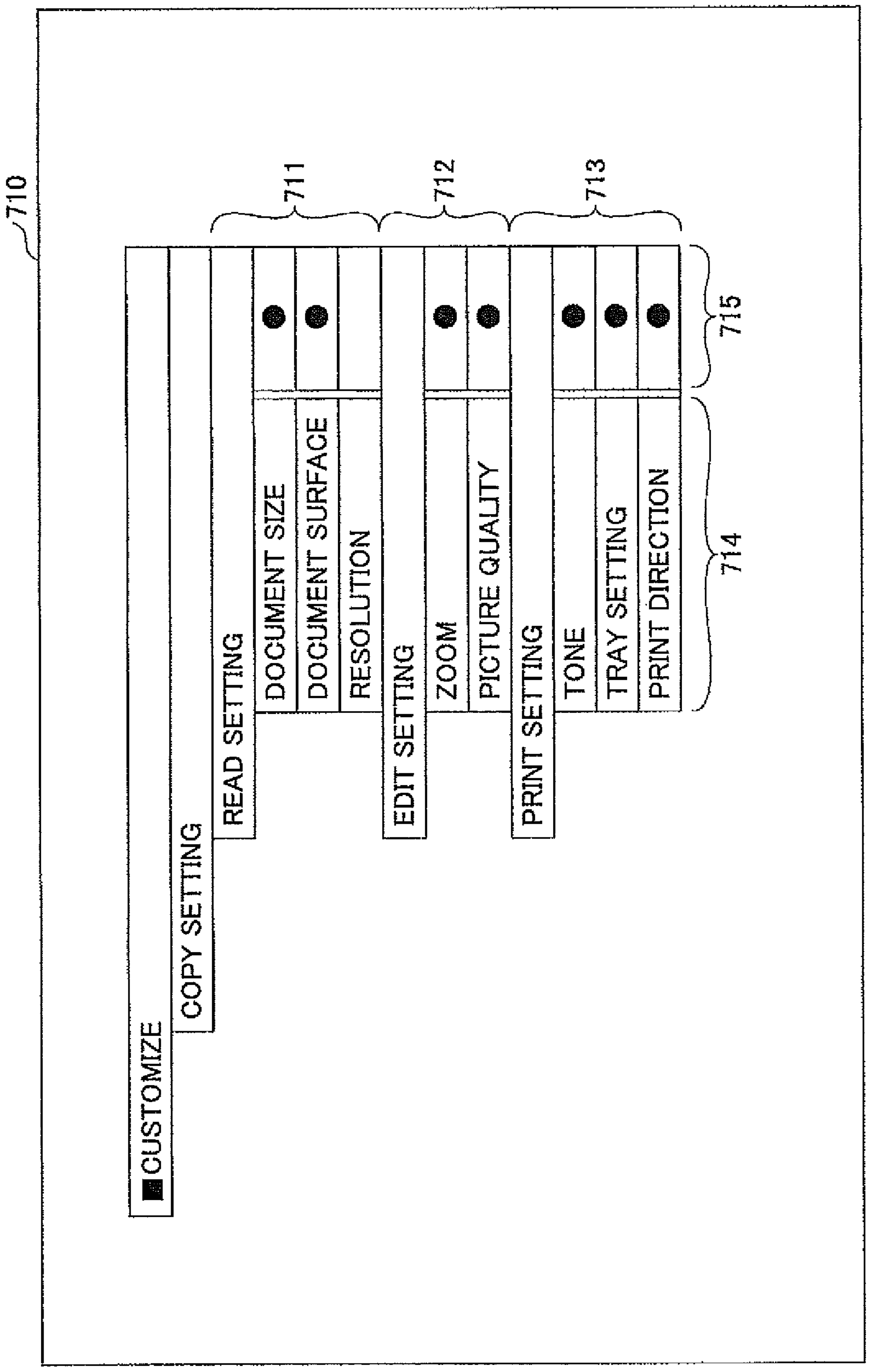
FIG. 26 is a diagram showing an example of a display of a customizing screen for the copy application.

FIG. 26 is a diagram showing an example of a display of the customizing screen for the copy application. A customizing screen 710 shown in FIG. 26 includes a customizing region 711 with respect to the category 1 (read setting category), a customizing region 712 with respect to the category 2 (document edit setting category), and a customizing region 713 with respect to the category 3 (print setting category). A row is displayed for each setting item that is selectable as the display target in each of the customizing regions 711 through 713. Each row includes a setting item display region 714 and a check region 715. The check region 715 is used to determine whether or not the corresponding setting item is to be selected as the display target. For example, in the category 1 (read setting category), the document size, the document surface and the resolution are selectable as the display target, and the document size and the document surface are selected as the display targets in this particular example as indicated by black circular marks showing the selection.

On the other hand, the setting item display region 714 is used to display the setting item name and to modify (or change) the category to which the corresponding setting item belongs. More particularly, when the setting item display region 714 of one row is selected, the following screen shown in FIG. 27 is displayed on the operation panel 602.

Figure 27:
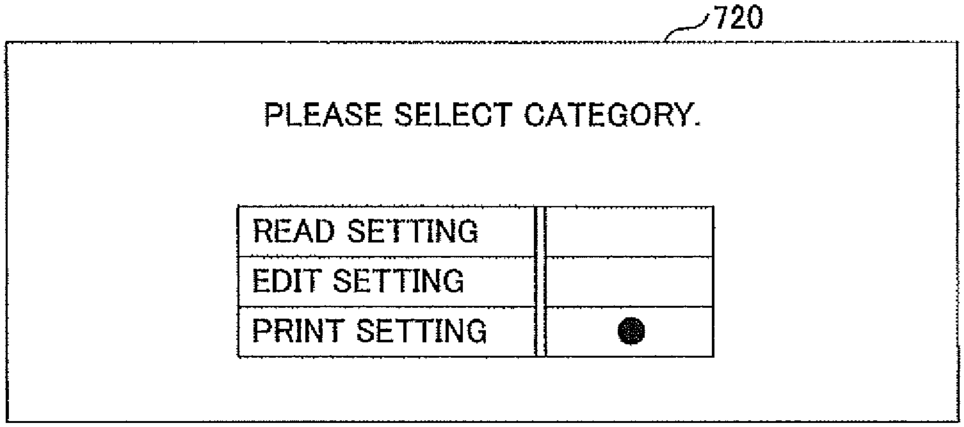
FIG. 27 is a diagram showing an example of a display of a category selection screen.

FIG. 27 is a diagram showing an example of a display of a category selection screen. A category selection screen (or category modifying screen) 720 shown in FIG. 27 includes a check region for each category with respect to the copy application UI 111. When one of the check regions is selected (checked) as indicated by a black circular mark, the setting items related to the row that is selected on the customizing screen 710 is moved to the selected category. For example, when the resolution is selected in the customizing screen 710 shown in FIG. 26 and the print setting category is selected on the category selection screen 720, the display state of the customizing screen 710 is updated in the following manner.

Figure 28:
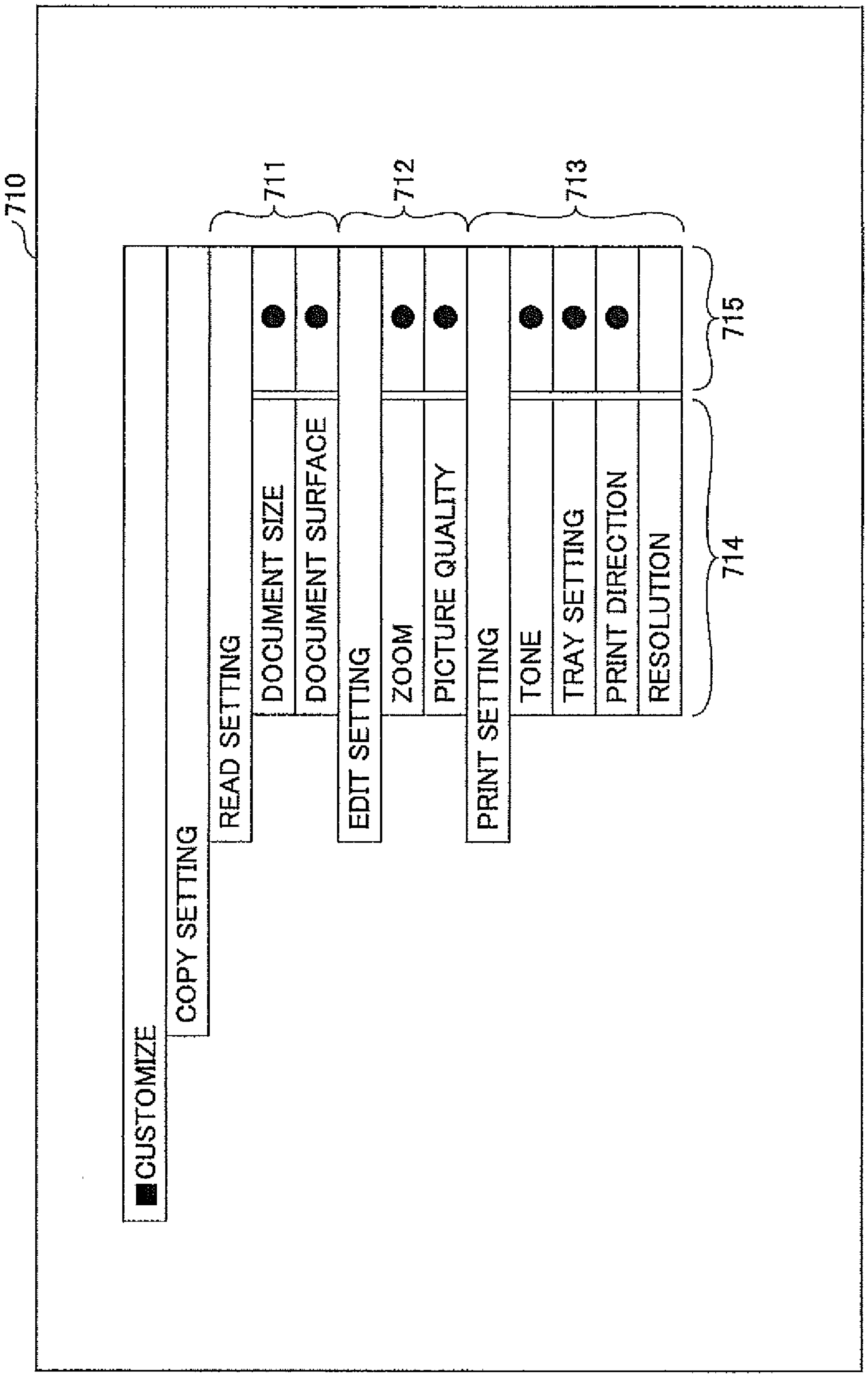
FIG. 28 is a diagram showing an example of a display of the customizing screen after modifying categories of setting items.

FIG. 28 is a diagram showing an example of a display of the customizing screen after modifying categories of setting items. In FIG. 28, the resolution has moved within the customizing region 713 of the print setting category.

When the rows of the category, in which the "read setting", "edit setting" and "print setting" are displayed, are selected on the customizing screen 710, a screen for modifying the category name of the categories may be displayed, so that the category name becomes modifiable by inputting a name on this screen.

In the customizing screen 710, the displaying state or the non-displaying state of the button can be set for each setting item, and in addition, the display position of the button of each setting item can be modified spanning the categories (that is, spanning the sheets (screens)). In other words, immediately after installing the copy application UI 111, the categories are registered in correspondence with the filter UI components utilized by the copy application UI 111. However, as may be seen from the customizing method made possible by the customizing screen 710 and the like, the category does not always correspond to each filter UI component and is classified by another unit (arbitrary unit selected by the user). Accordingly, regardless of the filter UI component to which each setting item is related, it is possible to freely modify the category of each setting item. Therefore, according to the MFP 1 of this embodiment, it is possible to carry out the customizing of the screen with a high degree of freedom.

Figure 29:
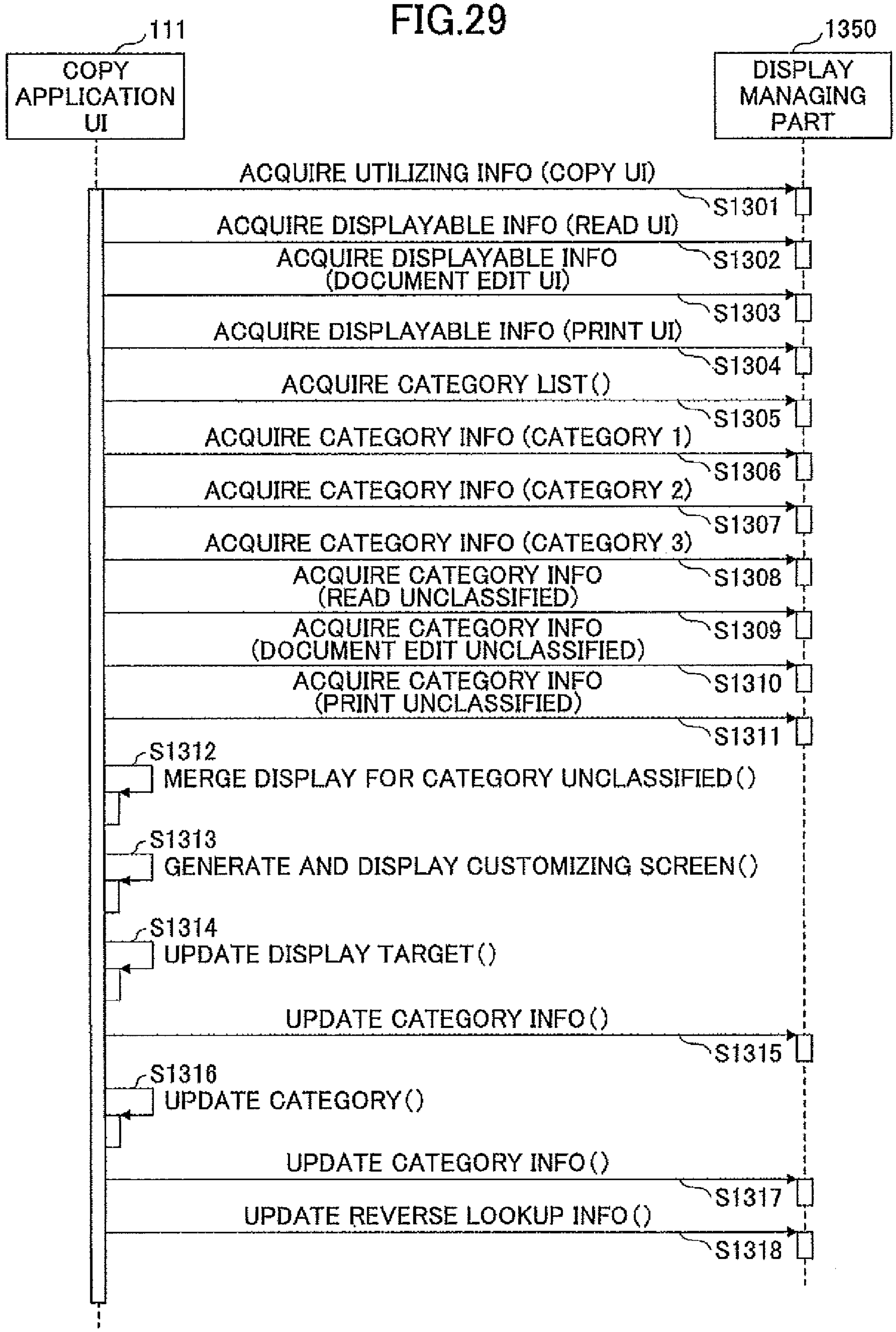
FIG. 29 is a sequence diagram for explaining a processing sequence of a customizing screen display process and a customizing process.

Next, a description will be given of a processing sequence executed by the MFP 1 when realizing the customizing described above. FIG. 29 is a sequence diagram for explaining the processing sequence of a customizing screen display process and a customizing process.

When the user inputs a copy screen customizing request via the operation panel 602, the UI customizing part 1360 acquires the utilizing information (refer to FIG. 20) registered with respect to the copy application UI 111 from the display managing part 1350 (step S1301). Then, the UI customizing part 1360 acquires the displayable information (refer to FIG. 18) registered with respect to each filter UI component which is defined as the utilizing target in the utilizing information (steps S1302 through S1304). In this example, the displayable information of each of the read UI 121, the document edit UI 122 and the print UI 123 are acquired.

Thereafter, the UI customizing part 1360 acquires the list information of the categories registered with respect to the copy application UI 111 from the display managing part 1350 (step S1305). The UI customizing part 1360 then acquires the category information (information related to the category name and the setting item belonging to the category) for each category included in the acquired list information (steps S1306 through S1311). In this example, the information (that is, the category information of the category 1, category 2, category 3, read unclassified, document edit unclassified and print unclassified) shown in FIG. 22 is acquired.

Next, the UI customizing part 1360 merges the information of the plurality of unclassified categories into a single (unclassified) category (step S1312). The UI customizing part 1360 thereafter generates the customizing screen 710 shown in FIG. 26, and displays the customizing screen 710 on the operation panel 602 (step S1313). The customizing screen 710 is generated in the following manner. First, the UI customizing part 1360 sets the setting items included in the displayable information acquired by the steps S1302 through S1304 as the setting items (options) selectable in the categories 1 through 3 other than the unclassified categories belonging to the copy application UI 111. In this state, the UI customizing part 1360 allocates the displayable information to the categories 1 through 3 in the acquired sequence (that is, the sequence in which the filter UI components in the utilizing information are defined) with which the displayable information is obtained in the steps S1302 through S1304. Hence, the setting item of the displayable information of the read UI 121 is allocated to the category 1, the setting item of the displayable information of the document edit UI 122 is allocated to the category 2, and the setting item of the displayable information of the print UI 123 is allocated to the category 3.

Then, of the setting items allocated as the options for each category, the UI customizing part 1360 sets the setting items included in the category information acquired in the steps S1306 through S1308 to the selected state. In this state, the setting item included in the category information may not be included as the option of the corresponding category. This is because, the setting item may have moved spanning the categories by the customizing which has already been made. In such a case, the UI customizing part 1360 corrects the option of each category based on the category information. More particularly, if the resolution which is included as the setting item in the displayable information of the read UI 121 has moved to the category 3, for example, the UI customizing part 1360 deletes the resolution from the options of the category 1, and adds the resolution to the options of the category 3 and sets the resolution to the selected state.

With respect to the unclassified categories, the setting items which have been merged into a single unclassified category are set as the options. At this point in time, however, nothing has been registered in the unclassified category, and the display of the unclassified category may be omitted.

After the processes described above, the UI customizing part 1360 displays the customizing screen 710 as shown in FIG. 26.

Next, when the setting item that is the display target is updated by the operation with respect to the check region 715 via the customizing screen 710 (step S1314), the UI customizing part 1360 reflects this updating to the category information that is managed by the display managing part 1350 (step S1315). For example, if a certain setting item is checked, the UI customizing part 1360 adds this certain setting item as the display target with respect to the category information to which this certain setting item belongs. On the other hand, if the checking of this certain setting item is cancelled, the UI customizing part 1360 deletes this certain setting item from the category information to which this setting item belongs.

In addition, when a certain setting item is selected on the customizing screen 710 and the category of this certain setting item is updated via the category selection screen 720 shown in FIG. 27, for example (step S1316), the UI customizing part 1360 updates the category information of this certain setting item (step S1317). In other words, this certain setting item is deleted from the category of the moving source, and is additionally registered in the category of the moving destination. Moreover, the UI customizing part 1360 updates the reverse lookup information of this certain setting item (step S1318). In other words, the category of the moving source is deleted from the reverse lookup information, and the category of the moving destination is added to the reverse lookup information.

Next, a description will be given of a case where a function extension is made with respect to a certain filter. Each filter is provided in advance with an extension point so that a dynamic function extension is possible without modifying the source code. In a case where a component (for example, dynamically linkable library) for extending a predetermined function exists within a predetermined folder, the extension point is implemented to call a predetermined function included in the predetermined component. That is, the function of each filter can be extended by generating the component for extending the predetermined function, which component has a function in accordance with the interface provided in the filter.

When such a function extension is made, it is necessary to enable a setting related to this function extension on the operation screen. A description will now be given of an example where this setting related to the function extension is made possible. In this embodiment, a description will be given of a case where a component (hereinafter referred to as "marking component") which makes a marking embedding function extension with respect to the printing filter 331 is installed. In this case, a marking UI, which is the UI component corresponding to the setting item of the marking component, is also installed together with the marking component. The marking embedding function refers to the function which makes a marking (prints a bar code, a tint block or the like) corresponding to a predetermined purpose (identifying printing medium, suppressing copying or the like) with respect to the printing medium.

Figure 30:
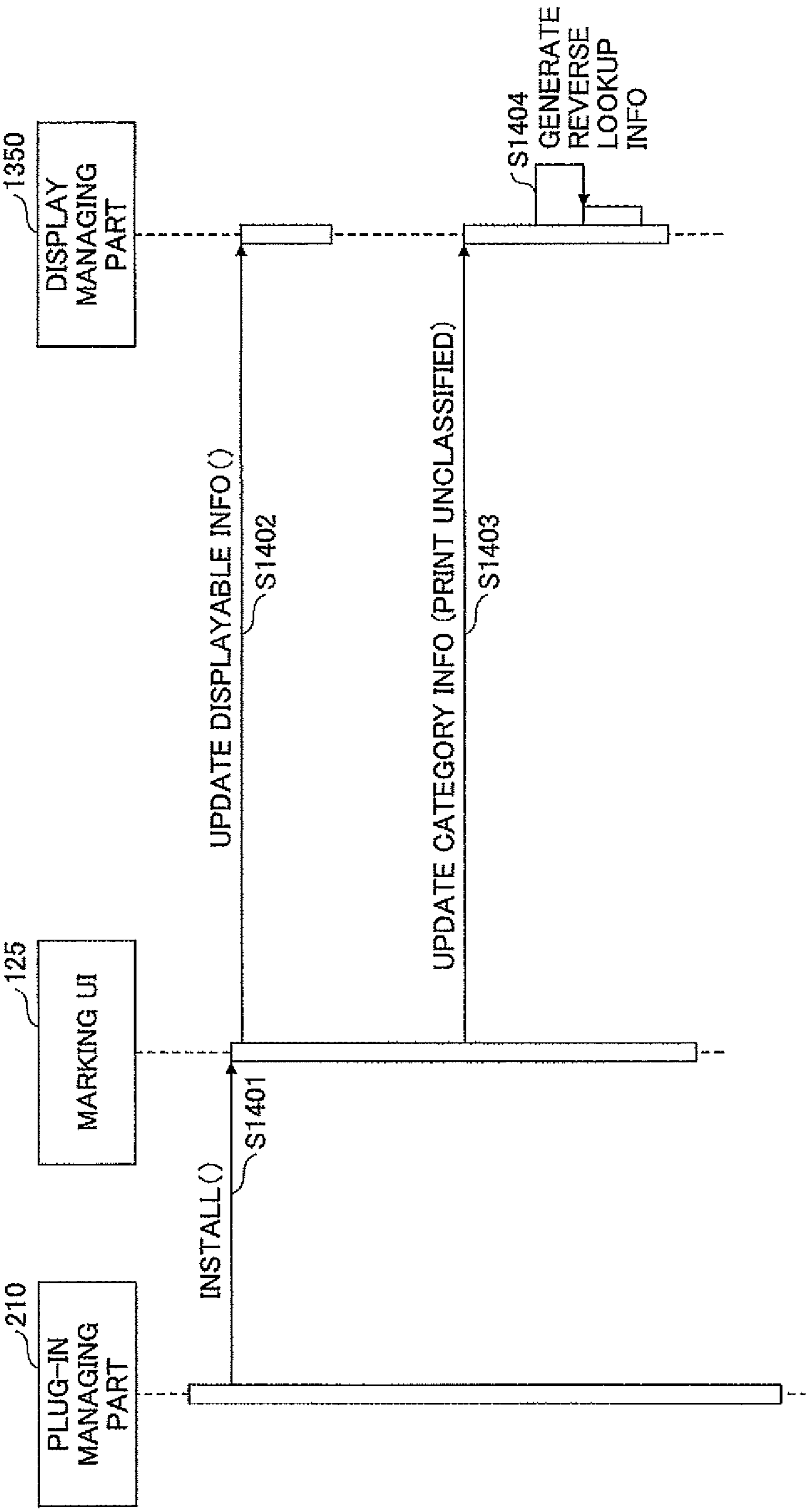
FIG. 30 is a sequence diagram for explaining a marking UI installing process.

FIG. 30 is a sequence diagram for explaining a marking UI installing process.

When a marking UI 125 is installed by the plug-in managing part 210 (step S1401), the marking UI 125 requests additional registration of a setting item ("embedded type") of the marking UI 125 with respect to the displayable information of the printing UI 123, to the display managing part 1350 (step S1402). In response to this request, the display managing part 1350 adds the setting item "embedded type" to the stored displayable information of the printing UI 123.

Then, the marking UI 125 requests the addition of the setting item ("embedded type") with respect to the category information of the print unclassified, to the display managing part 1350 (step S1403). In response to this request, the display managing part 1350 adds the setting item ("embedded type") with respect to the stored category information of the print unclassified. The category of the print unclassified is generated for each application utilized by the printing UI 123. Accordingly, a plurality of print unclassifieds may be registered in the display managing part 1350. In this case, the setting item is added with respect to all of the print unclassifieds.

In addition, the display managing part 1350 generates the reverse lookup information for the setting item of the marking UI 125 (step S1404). In this reverse lookup, information, the category of one or more print unclassifieds is related with respect to the setting item of the marking UI 125.

The setting item with respect to the function that is newly added by the extending function is added to the unclassified category for the following reason.

In this embodiment, it is possible to freely set the setting item that is the display target for each category. Hence, the setting item that is the display target may be set in each category under a clear intention of the user. In addition, the corresponding relationship between each category and each filter UI component is not necessarily clear. Furthermore, each filter may be utilized by a plurality of applications, and the addition of the setting item by the extending function with respect to the filter is desirably made equally with respect to all applications that utilize the same filter.

Under these circumstances, it is extremely difficult to automatically judge the category to which the setting item with respect to the marking UI 125 should be registered, in order to most closely follow the user's intention. However, the setting item is not displayed on the operation screen unless the setting item is registered in one of the categories.

Hence, in this embodiment, the category "unclassified" is prepared in advance (generated at the time of installing the application), and if it is necessary to add the setting item by making the function extension or the like, the setting item is provisionally added to the unclassified category.

Accordingly, after the process shown in FIG. 30 ends, the copy screen 500 is displayed again, and the button corresponding to the setting item "embedded type" is displayed when the unclassified sheet is displayed. As described above with respect to the step S1403, the setting item is added with respect to all of the print unclassifieds. For this reason, if there exists an application, other than the copy application 301 which utilizes the printing filter 331, the setting item "embedded type" is also displayed in the unclassified sheet of the operation screen of this other application.

By registering the newly added function to the unclassified, it is possible to set the setting item with respect to the newly added function as the display target, without having to modify the display target of each category set by the user.

When customizing the copy screen 500 after installing the marking UI 125, the customizing screen 710 is displayed in the following manner as a result of the process shown in FIG. 29.

Figure 31:
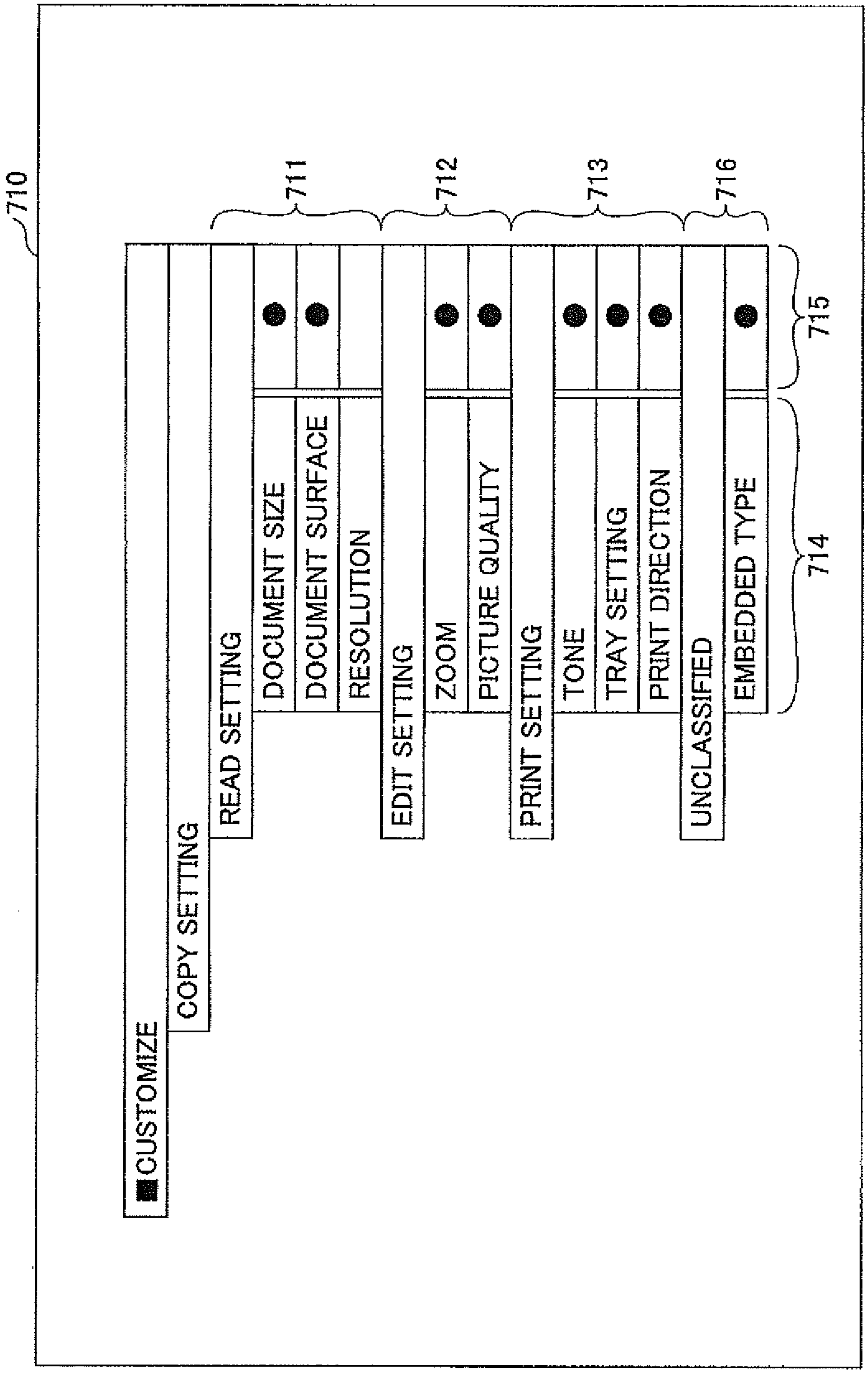
FIG. 31 is a diagram showing an example of a display of the customizing screen after installing the marking UI.

FIG. 31 is a diagram showing an example of the display of the customizing screen after installing the marking UI. In FIG. 31, those parts that are the same as those corresponding parts in FIG. 26 are designated by the same reference numerals.

A customizing region 716 of the unclassified is additionally provided in the customizing screen 710 shown in FIG. 31. This customizing region 716 includes "embedded type" as the setting item. The customizing region 716 is displayed based on the category information of the print unclassified.

If the "embedded type" is selected and the print setting category is selected on the category selection screen 720, the customizing screen 710 changes in the following manner.

Figure 32:
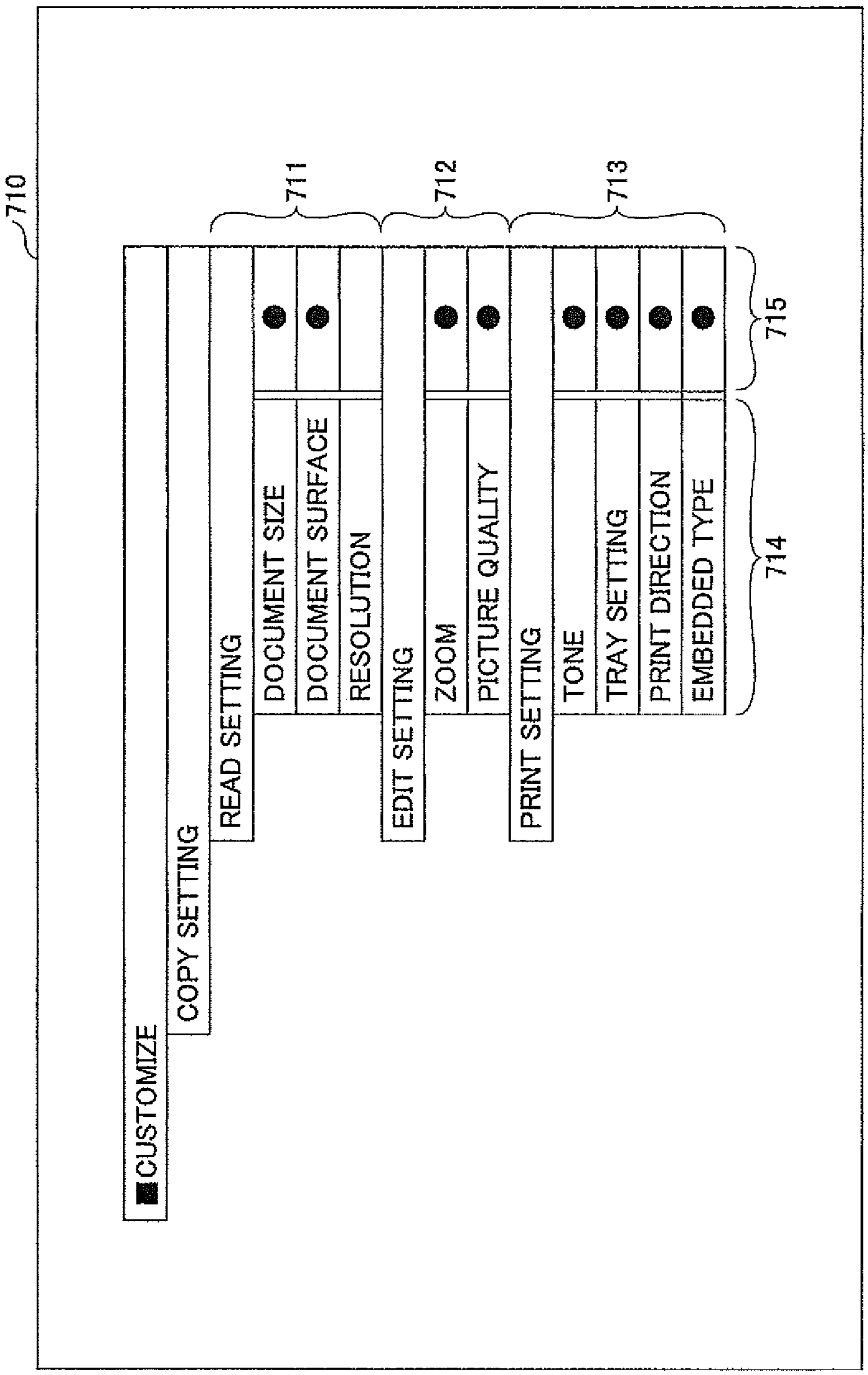
FIG. 32 is a diagram showing an example of a display of the customizing screen after modifying the categories of the setting items of the marking UI.

FIG. 32 is a diagram showing an example of the display of the customizing screen after modifying the categories of the setting items of the marking UI. As shown in FIG. 32, the "embedded type" has moved to the customizing region 713 of the print setting category.

Figure 33:
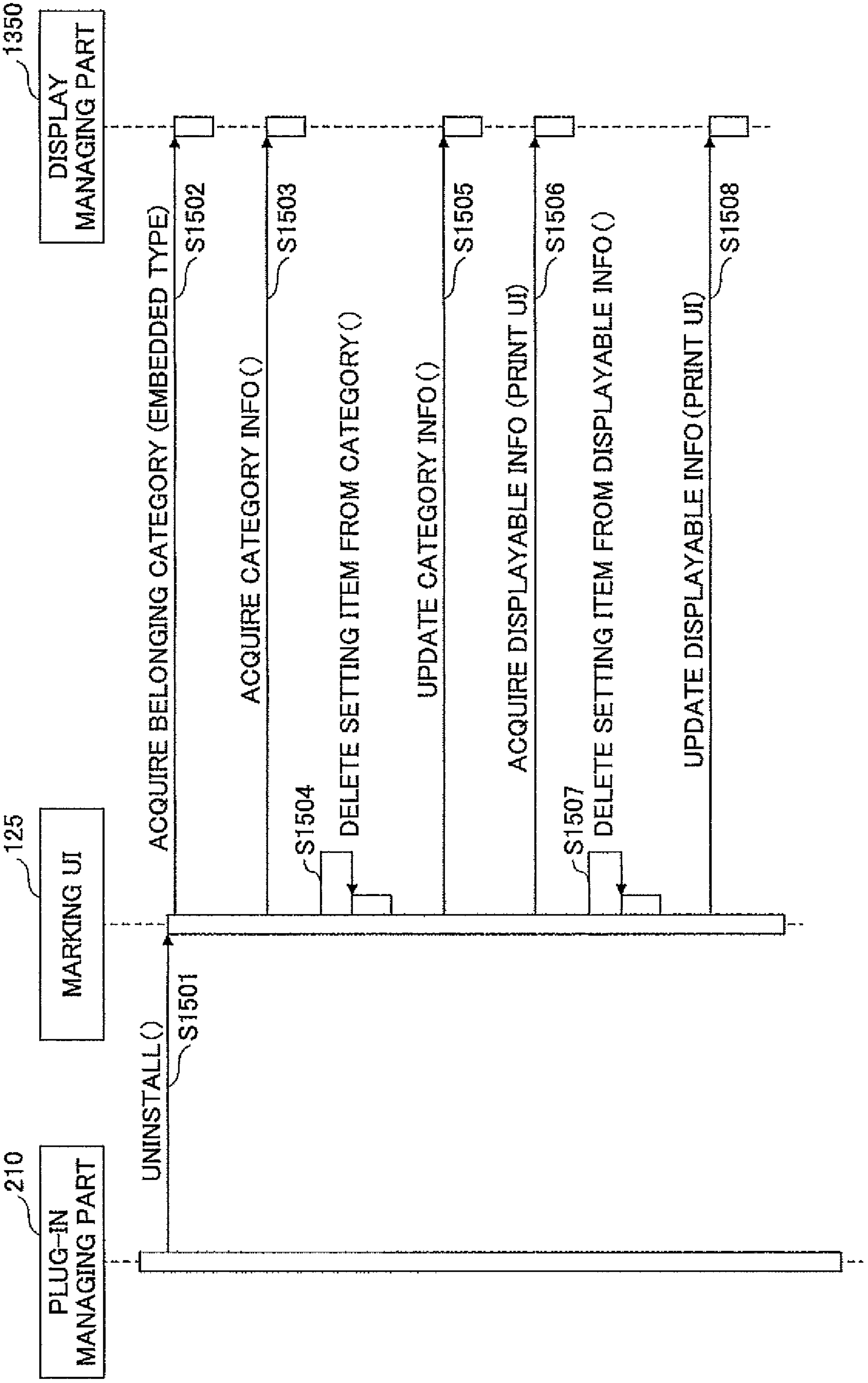
FIG. 33 is a sequence diagram for explaining a processing sequence at a time of uninstalling the marking UI.

Next, a description will be given of a processing sequence at the time of uninstalling the UI component. FIG. 33 is a sequence diagram for explaining the processing sequence at the time of uninstalling the marking UI.

When the marking UI 125 is notified of the uninstalling from the plug-in managing part 210 (step S1501), the marking UI 125 inquires the category to which the setting item ("embedded type") of the marking UI 125 belongs with respect to the display managing part 1350 (step S1502). The display managing part 1350 returns, to the marking UI 125, a list of category names belonging to the setting item of the marking UI 125, based on the reverse lookup information stored with respect to this setting item.

Then, the marking UI 125 acquires the category information corresponding to the acquired category names from the display managing part 1350 (step S1503), and deletes the setting item of the marking UI 125 from the acquired category information (step S1504). In addition, the marking UI 125 reregisters the updated category information in the display managing part 1350 (step S1505). The steps S1503 through S1505 are carried out with respect to all categories to which the setting item of the marking UI 125 belongs.

Next, the marking UI 125 acquires the displayable information of the printing UI 123 from the display managing part 1350 (step S1506). Moreover, the marking UI 125 deletes the setting item of the marking UI 125 from the acquired displayable information (step S1507). Furthermore, the marking UI 125 reregisters the updated displayable information in the display managing part 1350 (step S1508).

By the processes described above, the setting item of the marking UI 125 is deleted from each category. Hence, it is possible to prevent an undesirable situation where the setting item of the marking UI 125 is displayed after the marking UI 125 is uninstalled.

As described above, according to the MFP 1 of this embodiment, the displaying state or the non-displaying state of the display part (button or the like) corresponding to each setting item can be set for each setting item, and in addition, the display position of the display part of each setting item can be modified spanning the categories. Therefore, it is possible to carry out the customizing of the screen with a high degree of freedom.

When the flexibility of the customizing of the screen is improved, the positioning (meaning or significance) of each screen may become vague. Hence, in this embodiment, the "unclassified" category, which is a fixed category, is prepared, and whenever a new function (component) is added the setting item of the new function is added to this unclassified. Accordingly, it is possible to avoid the customized result of the customizing made by the user from being automatically updated against the intention or wishes of the user.

This embodiment clearly distinguishes the displayable information and the display target information. However, if all setting items may be displayed from the initial state where the filter or the like is installed, the display target information is not essential. If no display target information is provided, the displayable information may be used in place of the display target information.

This application claims the benefit of Japanese Patent Applications No. 2007-221412 filed Aug. 28, 2007 and No. 2008-138333 filed May 27, 2008, in the Japanese Patent Office, the disclosure of which is hereby incorporated by reference.

Further, the present intention is not limited to these embodiments, but various variations and modifications may be made without departing from the scope of the present invention.

What is claimed is:

1. An image forming apparatus comprising:

a processor; and a storage unit configured to store a plurality of programs, each of the plurality of programs being formed by a combination of a plurality of software parts;

wherein the processor comprises:

a first managing part configured to manage setting item information indicating a structure of setting items of each of the plurality of software parts in units of the plurality of software parts;

a registering part configured to register the setting items, indicated by the setting item information managed by the first managing part, in correspondence with each of a plurality of categories classified in units different from the units of the plurality of software parts;

a display part configured to display on a display unit a screen that includes display parts corresponding to the setting items registered in the registering part in correspondence with each of the plurality of categories, separately for each of the plurality of categories; and an editing part configured to edit a corresponding relationship between the plurality of categories and the setting items, wherein the registering part registers a setting item indicated by setting item information of a newly installed software part, in correspondence with an unclassified category, and wherein the editing part edits the corresponding relationship in order to make the setting item corresponding to the unclassified category correspond to one of the plurality of categories registered by the registering part.

2. The image forming apparatus as claimed in claim 1, wherein the processor further comprises:

an editing screen display part configured to display on the display unit an editing screen on which the editing part edits the corresponding relationship, wherein the editing part edits the corresponding relationship depending on an input with respect to the editing screen displayed on the display unit.

3. The image forming apparatus as claimed in claim 1, wherein the processor further comprises:

a deleting part configured to delete a corresponding relationship between the plurality of categories and setting items indicated by setting item information of a newly uninstalled software part.

4. The image forming apparatus as claimed in claim 1, wherein the processor further comprises:

a second managing part configured to manage correspondence information of the setting items, in correspondence with each of the plurality of categories classified in the units different from the units of the plurality of software parts, wherein the registering part registers the setting item indicated by setting item information of the newly installed software part, in correspondence with the unclassified category in the correspondence information.

5. The image forming apparatus as claimed in claim 4, wherein the editing part edits the correspondence information depending on the input with respect to the editing screen displayed on the display unit, and wherein the processor further comprises:

a deleting part configured to delete the corresponding relationship between the plurality of categories and the setting items indicated by setting item information of the newly installed software part, from the correspondence information.

6. A display screen customizing method to be implemented in an image forming apparatus which has a plurality of programs configured to be utilized via corresponding display screens, each of the plurality of programs being formed by a combination of a plurality of software parts, said display screen customizing method comprising:

a first managing procedure to manage setting item information indicating a structure of setting items of each of the plurality of software parts in units of the plurality of software parts;

a registering procedure to register the setting items indicated by the setting item information managed by the first managing procedure in correspondence with each of a plurality of categories classified in units different from the units of the plurality of software parts;

a display procedure to display on a display unit a screen that includes display parts corresponding to the setting items registered by the registering procedure in correspondence with each of the plurality of categories, separately for each of the plurality of categories; and an editing procedure to edit a corresponding relationship between the plurality of categories and the setting items, wherein the registering procedure registers a setting item indicated by setting item information of a newly installed software part, in correspondence with an unclassified category, and wherein the editing procedure edits the corresponding relationship in order to make the setting item corresponding to the unclassified category correspond to one of the plurality of categories registered by the registering procedure.

7. The display screen customizing method as claimed in claim 6, further comprising:

an editing screen display procedure to display on the display unit an editing screen on which the editing procedure edits the corresponding relationship, wherein the editing procedure edits the corresponding relationship depending on an input with respect to the editing screen displayed on the display unit.

8. The display screen customizing method as claimed in claim 6, further comprising:

a deleting procedure to delete a corresponding relationship between the plurality of categories and setting items indicated by setting item information of a newly uninstalled software part.

9. The display screen customizing method as claimed in claim 6, further comprising:

a second managing procedure to manage correspondence information of the setting items, in correspondence with each of the plurality of categories classified in the units different from the units of the plurality of software parts, wherein the registering procedure registers the setting item indicated by setting item information of the newly installed software part, in correspondence with the unclassified category in the correspondence information.

10. The display screen customizing method as claimed in claim 9, wherein the editing procedure edits the correspondence information depending on the input with respect to the editing screen displayed on the display unit, and further comprising:

a deleting procedure to delete the corresponding relationship between the plurality of categories and the setting items indicated by setting item information of the newly installed software part, from the correspondence information.

11. A non-transitory computer-readable storage medium that stores a screen customizing program which, when executed by a computer, causes the computer to perform a screen customizing process to customize a screen of an image forming apparatus which has a plurality of programs configured to be utilized via corresponding display screens, each of the plurality of programs being formed by a combination of a plurality of software parts, said screen customizing process comprising:

a first managing procedure causing the computer to manage setting item information indicating a structure of setting items of each of the plurality of software parts in units of the plurality of software parts;

a registering procedure causing the computer to register the setting items indicated by the setting item information managed by the first managing procedure in correspondence with each of a plurality of categories classified in units different from the units of the plurality of software parts;

a display procedure causing the computer to display on a display unit a screen that includes display parts corresponding to the setting items registered by the registering procedure in correspondence with each of the plurality of categories, separately for each of the plurality of categories; and an editing procedure causing the computer to edit a corresponding relationship between the plurality of categories and the setting items, wherein the registering procedure registers a setting item indicated by setting item information of a newly installed software part, in correspondence with an unclassified category, and wherein the editing procedure edits the corresponding relationship in order to make the setting item corresponding to the unclassified category correspond to one of the plurality of categories registered by the registering procedure.

12. The non-transitory computer-readable storage medium as claimed in claim 11, wherein the screen customizing process further comprises:

an editing screen display procedure causing the computer to display on the display unit an editing screen on which the editing procedure edits the corresponding relationship, wherein the editing procedure edits the corresponding relationship depending on an input with respect to the editing screen displayed on the display unit.

13. The non-transitory computer-readable storage medium as claimed in claim 11, wherein the screen customizing process further comprises:

a deleting procedure causing the computer to delete the corresponding relationship between the plurality of categories and the setting items indicated by the setting item information of the newly uninstalled software part.

14. The non-transitory computer-readable storage medium as claimed in claim 11, wherein the screen customizing process further comprises:

a second managing procedure to manage correspondence information of the setting items, in correspondence with each of the plurality of categories classified in the units different from the units of the plurality of software parts, wherein the registering procedure registers the setting item indicated by setting item information of the newly installed software part, in correspondence with the unclassified category in the correspondence information.

15. The non-transitory computer-readable storage medium as claimed in claim 14, wherein the editing procedure edits the correspondence information depending on the input with respect to the editing screen displayed on the display unit, and wherein the screen customizing process further comprises:

a deleting procedure to delete the corresponding relationship between the plurality of categories and the setting items indicated by setting item information of the newly installed software part, from the correspondence information.

* * * * *